United States Patent
Yamamoto

(10) Patent No.: US 7,434,478 B2
(45) Date of Patent: *Oct. 14, 2008

(54) ELECTROMAGNETIC FLOWMETER FOR APPLYING A MAGNETIC FIELD AND A PLURALITY OF FREQUENCY COMPONENTS TO A FLUID

(75) Inventor: Tomoshige Yamamoto, Tokyo (JP)

(73) Assignee: Yamatake Corporation, Tokyo (JP)

(*) Notice: Subject to any disclaimer, the term of this patent is extended or adjusted under 35 U.S.C. 154(b) by 98 days.

This patent is subject to a terminal disclaimer.

(21) Appl. No.: 11/578,208

(22) PCT Filed: Apr. 8, 2005

(86) PCT No.: PCT/JP2005/006937

§ 371 (c)(1),
(2), (4) Date: Oct. 6, 2006

(87) PCT Pub. No.: WO2005/098373

PCT Pub. Date: Oct. 20, 2005

(65) Prior Publication Data

US 2007/0272030 A1    Nov. 29, 2007

(30) Foreign Application Priority Data

Apr. 9, 2004 (JP) .............................. 2004-116252

(51) Int. Cl.
*G01F 1/58* (2006.01)
(52) U.S. Cl. ..................................... 73/861.12; 702/45
(58) Field of Classification Search ............... 73/861.12
See application file for complete search history.

(56) References Cited

U.S. PATENT DOCUMENTS

| | | | | |
|---|---|---|---|---|
| 2007/0088511 A1* | 4/2007 | Yamamoto | .................... | 702/45 |
| 2007/0220993 A1* | 9/2007 | Yamamoto | ............... | 73/861.16 |
| 2007/0234820 A1* | 10/2007 | Yamamoto | ............... | 73/861.12 |
| 2008/0028867 A1* | 2/2008 | Yamamoto | ............... | 73/861.12 |

FOREIGN PATENT DOCUMENTS

| | | |
|---|---|---|
| JP | 2004-108973 A | 4/2004 |
| JP | 2004-108975 A | 4/2004 |
| WO | WO 03/027614 A | 4/2003 |

* cited by examiner

*Primary Examiner*—Harshad Patel
(74) *Attorney, Agent, or Firm*—Blakely, Sokoloff, Taylor & Zafman LLP

(57) ABSTRACT

An electromagnetic flowmeter includes a measuring tube through which a fluid flows, electrodes which detect an electromotive force generated by a magnetic field applied to the fluid. An exciting coil applies, to the fluid, a magnetic field asymmetrical to a plane (PLN) which includes the electrodes and is perpendicular to the axial direction of the measuring tube. A signal conversion unit extracts a $\partial A/\partial t$ component from the resultant electromotive force of the electromotive force. A flow rate output unit removes a variation factor for a span as a coefficient applied to the magnitude of the flow velocity on the basis of the $\partial A/\partial t$ component, and calculates the flow rate of the fluid from the result obtained by removing the variation factor. The exciting coil applies the magnetic fields including the plurality of frequency components to the fluid.

14 Claims, 14 Drawing Sheets

ELECTROMAGNETIC FLOWMETER FOR APPLYING A MAGNETIC FIELD AND A PLURALITY OF FREQUENCY COMPONENTS TO A FLUID

This is a non-provisional application claiming the benefit of International application number PCT/JP2005/006937, filed Apr. 8, 2005.

TECHNICAL FIELD

The present invention relates to an electromagnetic flowmeter and, more particularly, to a span correction technique of automatically correcting a coefficient to be applied to the flow velocity of a component originating from the flow rate of a fluid to be measured of the inter-electrode electromotive force detected by electrodes.

BACKGROUND ART

A logical propositional portion common to a prior art and the present invention and necessary to understand both of them will be described. Generally known mathematical basic knowledge will be described first.

A cosine wave $P \cdot \cos(\omega \cdot t)$ and a sine wave $Q \cdot \sin(\omega \cdot t)$ which have the same frequency but different amplitudes are combined into the following cosine wave. Let P and Q be amplitudes, and $\omega$ be an angular frequency.

$$P \cdot \cos(\omega \cdot t) + Q \cdot \sin(\omega \cdot t) = (P^2 + Q^2)^{1/2} \cdot \cos(\omega \cdot t - \epsilon) \text{ for } \epsilon = \tan^{-1}(Q/P) \quad (1)$$

In order to analyze the combining operation in equation (1), it is convenient to perform mapping on a complex coordinate plane so as to plot an amplitude P of cosine wave $P \cdot \cos(\omega \cdot t)$ along a real axis and an amplitude Q of the sine wave $Q \cdot \sin(\omega \cdot t)$ along an imaginary axis. That is, on the complex coordinate plane, a distance $(P^2 + Q^2)^{1/2}$ from the origin gives the amplitude of the combined wave, and an angle $\epsilon = \tan^{-1}(Q/P)$ gives the phase difference between the combined wave and $\omega \cdot t$.

In addition, on the complex coordinate plane, the following relational expression holds.

$$L \cdot \exp(j \cdot \epsilon) = L \cdot \cos(\epsilon) + j \cdot L \cdot \sin(\epsilon) \quad (2)$$

Equation (2) is an expression associated with a complex vector, in which j is an imaginary unit, L gives the length of the complex vector, and e gives the direction of the complex vector. In order to analyze the geometrical relationship on the complex coordinate plane, it is convenient to use conversion to a complex vector.

The following description uses mapping onto a complex coordinate plane like that described above and geometrical analysis using complex vectors to show how an inter-electrode electromotive force behaves and explain how the prior art uses this behavior.

A complex vector arrangement with one coil set and an electrode pair in the electromagnetic flowmeter proposed by the present inventor (see patent reference WO 03/027614) will be described next.

FIG. 21 is a block diagram for explaining the principle of the electromagnetic flowmeter in the above patent reference. This electromagnetic flowmeter includes a measuring tube 1 through which a fluid to be measured flows, a pair of electrodes 2a and 2b which are placed to face each other in the measuring tube 1 so as to be perpendicular to both a magnetic field to be applied to the fluid and an axis PAX of the measuring tube 1 and come into contact with the fluid, and detect the electromotive force generated by the magnetic flow and the flow of the fluid, and an exciting coil 3 which applies, to the fluid, a time-changing magnetic field asymmetric on the front and rear sides of the measuring tube 1 which are bordered on a plane PLN which includes the electrodes 2a and 2b, with the plane PLN serving as a boundary of the measuring tube 1.

Of a magnetic field Ba generated by the exciting coil 3, a magnetic field component (magnetic flux density) B1 orthogonal to both an electrode axis EAX connecting the electrodes 2a and 2b and the measuring tube axis PAX on the electrode axis EAX is given by $$B1 = b1 \cdot \cos(\omega 0 \cdot t - \theta 1) \quad (3)$$

In equation (3), b1 is the amplitude, $\omega 0$ is an angular frequency, and $\theta 1$ is a phase difference (phase lag) from $\omega 0 \cdot t$. The magnetic flux density B1 will be referred to as the magnetic field B1 hereinafter.

An inter-electrode electromotive force which originates from a change in magnetic field and is irrelevant to the flow velocity of a fluid to be measured will be described first. Since the electromotive force originating from the change in magnetic field depends on a time derivative dB/dt of the magnetic field, and hence the magnetic field B1 generated by the exciting coil 3 is differentiated according to $$dB1/dt = -\omega 0 \cdot b1 \cdot \sin(\omega 0 \cdot t - \theta 1) \quad (4)$$

If the flow velocity of the fluid to be measured is 0, a generated eddy current is only a component originating from a change in magnetic field. An eddy current I due to a change in the magnetic field Ba is directed as shown in FIG. 22. Therefore, an inter-electrode electromotive force E which is generated by a change in the magnetic field Ba and is irrelevant to the flow velocity is directed as shown in FIG. 22 within a plane including the electrode axis EAX and the measuring tube axis PAX. This direction is defined as the negative direction.

At this time, the inter-electrode electromotive force E is the value obtained by multiplying a time derivative $-dB1/dt$ of a magnetic field whose direction is taken into consideration by a coefficient k (a complex number associated with the conductivity and permittivity of the fluidity to be measured and the structure of the measuring tube 1 including the layout of the electrodes 2a and 2b), as indicated by the following equation:

$$E = k \cdot \omega 0 \cdot b1 \cdot \sin(\omega 0 \cdot t - \theta 1) \quad (5)$$

Equation (5) is rewritten into the following equation:

$$\begin{aligned} E &= k \cdot \omega 0 \cdot b1 \cdot \{\sin(-\theta 1)\} \cdot \cos(\omega 0 \cdot t) + \\ &\quad k \cdot \omega 0 \cdot b1 \cdot \{\cos(-\theta 1)\} \cdot \sin(\omega 0 \cdot t) \\ &= k \cdot \omega 0 \cdot b1 \cdot \{-\sin(\theta 1)\} \cdot \cos(\omega 0 \cdot t) + \\ &\quad k \cdot \omega 0 \cdot b1 \cdot \{\cos(\theta 1)\} \cdot \sin(\omega 0 \cdot t) \end{aligned} \quad (6)$$

In this case, if equation (6) is mapped on the complex coordinate plane with reference to $\omega 0 \cdot t$, a real axis component Ex and an imaginary axis component Ey are given by $$\begin{aligned} Ex &= k \cdot \omega 0 \cdot b1 \cdot \{-\sin(\theta 1)\} \\ &= k \cdot \omega 0 \cdot b1 \cdot \{\cos(\pi/2 + \theta 1)\} \end{aligned} \quad (7)$$

$$\begin{aligned} Ey &= k \cdot \omega 0 \cdot b1 \cdot \{\cos(\theta 1)\} \\ &= k \cdot \omega 0 \cdot b1 \cdot \{\sin(\pi/2 + \theta 1)\} \end{aligned} \quad (8)$$

In addition, Ex and Ey represented by equations (7) and (8) are transformed into a complex vector Ec represented by $$Ec = Ex + j \cdot Ey \qquad (9)$$
$$= k \cdot \omega 0 \cdot b1 \cdot \{\cos(\pi/2 + \theta 1)\} +$$
$$j \cdot k \cdot \omega 0 \cdot b1 \cdot \{\sin(\pi/2 + \theta 1)\}$$
$$= k \cdot \omega 0 \cdot b1 \cdot \{\cos(\pi/2 + \theta 1)\} +$$
$$j \cdot \sin(\pi/2 + \theta 1)\}$$
$$= k \cdot \omega 0 \cdot b1 \cdot \exp\{j \cdot (\pi/2 + \theta 1)\}$$

In addition, the coefficient k described above is transformed into a complex vector to obtain the following equation:

$$k = rk \cdot \cos(\theta 00) + j \cdot rk \cdot \sin(\theta 00) \qquad (10)$$
$$= rk \cdot \exp(j \cdot \theta 00)$$

In equation (10), rk is a proportional coefficient, and $\theta 00$ is the angle of the vector k with respect to the real axis.

Substituting equation (10) into equation (9) yields an inter-electrode electromotive force Ec (an inter-electrode electromotive force which originates from only a temporal change in magnetic field and is irrelevant to the flow velocity) transformed into complex coordinates as follows:

$$Ec = rk \cdot \exp(j \cdot \theta 00) \cdot \omega 0 \cdot b1 \cdot \exp\{j \cdot (\pi/2 + \theta 1)\} \qquad (11)$$
$$= rk \cdot \omega 0 \cdot b1 \cdot \exp\{j \cdot (\pi/2 + \theta 1 + \theta 00)\}$$

In equation (11), $rk \cdot \omega 0 \cdot b1 \cdot \exp\{j \cdot (p/2 + \theta 1 + \theta 00)\}$ is a complex vector having a length $rk \cdot \omega 0 \cdot b1$ and an angle $p/2 + \theta 1 + \theta 00$ with respect to the real axis.

An inter-electrode electromotive force originating from the flow velocity of a fluid to be measured will be described next. Letting $V(V \neq 0)$ be the magnitude of the flow velocity of the fluid, since a component v×Ba originating from a flow velocity vector v of the fluid is generated in a generated eddy current in addition to the eddy current I when the flow velocity is 0, an eddy current Iv generated by the flow velocity vector v and the magnetic field Ba is directed as shown in FIG. 23. Therefore, the direction of an inter-electrode electromotive force Ev generated by the flow velocity vector v and the magnetic field Ba becomes opposite to the direction of the inter-electrode electromotive force E generated by the temporal change, and the direction of Ev is defined as the positive direction.

In this case, as indicated by the following equation, the inter-electrode electromotive force Ev originating from the flow velocity is the value obtained by multiplying the magnetic field B1 as indicated by the following equation by a coefficient kv (a complex number associated with a magnitude V of the flow velocity, the conductivity and permittivity of the fluidity to be measured, and the structure of the measuring tube 1 including the arrangement of the electrodes 2a and 2b):

$$Ev = kv\{b1 \cdot \cos(\omega 0 \cdot t - \theta 1)\} \qquad (12)$$

Equation (12) is rewritten into $$Ev = kv \cdot b1 \cdot \cos(\omega 0 \cdot t) \cdot \cos(-\theta 1) - \qquad (13)$$
$$kv \cdot b1 \cdot \sin(\omega 0 \cdot t) \cdot \sin(-\theta 1)$$
$$= kv \cdot b1 \cdot \{\cos(\theta 1)\} \cdot \cos(\omega 0 \cdot t) +$$
$$kv \cdot b1 \cdot \{\sin(\theta 1)\} \cdot \sin(\omega 0 \cdot t)$$

In this case, when mapping equation (13) on the complex coordinate plane with reference to $\omega 0 \cdot t$, a real axis component Evx and an imaginary axis component Evy are given by $$Evx = kv19 \, b1 \cdot \{\cos(\theta 1)\} \qquad (14)$$

$$Evy = kv \cdot b1 \cdot \{\sin(\theta 1)\} \qquad (15)$$

In addition, Evx and Evy represented by equations (14) and (15) are transformed into a complex vector Evc represented by $$Evc = Evx + j \cdot Evy \qquad (16)$$
$$= kv \cdot b1 \cdot \{\cos(\theta 1)\} + j \cdot kv \cdot b1 \cdot \{\sin(\theta 1)\}$$
$$= kv \cdot b1 \cdot \{\cos(\theta 1) + j \cdot \sin(\theta 1)\}$$
$$= kv \cdot b1 \cdot \exp(j \cdot \theta 1)$$

In addition, the coefficient kv described above is transformed into a complex vector to obtain the following equation:

$$kv = rkv \cdot \cos(\theta 01) + j \cdot rkv \cdot \sin(\theta 01) \qquad (17)$$
$$= rkv \cdot \exp(j \cdot \theta 01)$$

In equation (17), rkv is a proportional coefficient, and $\theta 01$ is the angle of the vector kv with respect to the real axis. In this case, rkv is equivalent to the value obtained by multiplying the proportional coefficient rk (see equation (10)) described above by the magnitude V of the flow velocity and a proportion coefficient γ. That is, the following equation holds:

$$rkv = \gamma \cdot rk \cdot V \qquad (18)$$

Substituting equation (17) into equation (16) yields an inter-electrode electromotive force Evc transformed into complex coordinates as follows:

$$Evc = kv \cdot b1 \cdot \exp(j \cdot \theta 1) \qquad (19)$$
$$= rkv \cdot b1 \cdot \exp\{j \cdot (\theta 1 + \theta 01)\}$$

In equation (19), $rkv \cdot b1 \cdot \exp\{j \cdot (\theta 1 + \theta 01)\}$ is a complex vector having a length $rkv \cdot b1$ and an angle $\theta 1 + \theta 01$ with respect to the real axis.

An inter-electrode electromotive force Eac as a combination of inter-electrode electromotive force Ec originating from a temporal change in magnetic field and an inter-electrode electromotive force Evc originating from the flow velocity of the fluid is expressed by the following equation according to equations (11) and (19).

$$Eac = Ec + Evc \qquad (20)$$
$$= rk \cdot \omega 0 \cdot b1 \cdot \exp\{j \cdot (\pi/2 + \theta 1 + \theta 00)\} +$$
$$rkv \cdot b1 \cdot \exp\{j \cdot (\theta 1 + \theta 01)\}$$

As is obvious from equation (20), an inter-electrode electromotive force Eac is written by two complex vectors $rk \cdot \omega 0 \cdot b1 \cdot \exp\{j \cdot (p/2+\theta 1+\theta 00)\}$ and $rkv \cdot b1 \cdot \exp\{j \cdot (\theta 1+\theta 01)\}$. The length of the resultant vector obtained by combining the two complex vectors represents the amplitude of the output (the inter-electrode electromotive force Eac), and an angle $\phi$ of the resultant vector represents the phase difference (phase delay) of the inter-electrode electromotive force Eac with respect to the phase $\omega 0 \cdot t$ of the input (exciting current). Note that a flow rate is obtained by multiplying a flow velocity by the cross-sectional area of the measuring tube. In general, therefore, a flow velocity and a flow rate have a one-to-one relationship in calibration in an initial state, and obtaining a flow velocity is equivalent to obtaining a flow rate. For this reason, the following description will exemplify the scheme of obtaining a flow velocity (for obtaining a flow rate).

Under the above principle, the electromagnetic flowmeter in the above patent reference extracts a parameter (asymmetric excitation parameter) free from the influence of a span shift, and outputs a flow rate on the basis of the extracted parameter, thereby solving the problem of the span shift.

A span shift will be described with reference to FIG. 24. Assume that the magnitude V of the flow velocity measured by the electromagnetic flowmeter has changed in spite of the fact that the flow velocity of a fluid to be measured has not changed. In such a case, a span shift can be thought as a cause of this output variation.

Assume that calibration is performed such that when the flow velocity of a fluid to be measured is 0 in an initial state, the output from the electromagnetic flowmeter becomes 0 (v), and when the flow velocity is 1 (m/sec), the output becomes 1 (v). In this case, an output from the electromagnetic flowmeter is a voltage representing the magnitude V of a flow velocity. According to this calibration, if the flow velocity of a fluid to be measured is 1 (m/sec), the output from the electromagnetic flowmeter should be 1 (v). When a given time t1 has elapsed, however, the output from the electromagnetic flowmeter may become 1.2 (v) in spite of the fact that the flow velocity of the fluid to be measured remains 1 (m/sec). A span shift can be thought as a cause of this output variation. A phenomenon called a span shift occurs when, for example, the value of an exciting current flowing in the exciting coil cannot be maintained constant.

DISCLOSURE OF INVENTION

Problem to be Solved by the Invention

A physical phenomenon necessary for explanation will be described first. When an object moves in a changing magnetic field, electromagnetic induction generates two types of electric fields, namely (a) electric field $E^{(i)} = \partial A/\partial t$ which is generated by a temporal change in magnetic field, and (b) electric field $E^{(v)} = v \times B$ which is generated as the object moves in the magnetic field. In this case, $v \times B$ represents the outer product of v and B, $\partial A/\partial t$ represents the partial differential of A with respect to time. In this case, v, B, and A respectively correspond to the following and are vectors having directions in three dimensions (x, y, and z) (v: flow velocity, B: magnetic flow density, and A: vector potential (whose relationship with the magnetic flux density is represented by B=rotA). Note, however, that the three-dimensional vectors in this case differ in meaning from vectors on a complex plane. These two types of electric fields generate a potential distribution in the fluid, and electrodes can detect this potential.

The electromagnetic flowmeter in the above patent reference takes into consideration the angle $\theta 00$ of the vector k with respect to the real axis and the angle $\theta 01$ of the vector kv with respect to the real axis in a basic logical development. However, as a constraint for the electromagnetic flowmeter which can solve the problem of a span shift, the flowmeter is premised on $\theta 00 = \theta 01 = 0$. That is, adjusting conditions for the electromagnetic flowmeter to satisfy the premise is the constraint. Note that $\theta 1$ is an initial phase, which is a phase portion common to an exciting current and an inter-electrode electromotive force. When considering only the phase difference between an exciting current and an inter-electrode electromotive force as in the prior art and the present invention, assume that $\theta 1=0$, for the sake of easy understanding.

The influence of the above constraint on flow rate measurement will be described in terms of complex vectors with reference to FIG. 25. Referring to FIG. 25, reference symbol Re denotes a real axis; and Im, an imaginary axis. First of all, the inter-electrode electromotive force Ec which depends on only a temporal change in magnetic field but does not depend on the flow velocity of the fluid to be measured will be called a $\partial A/\partial t$ component, and the $\partial A/\partial t$ component is represented by a vector Va. In addition, the inter-electrode electromotive force Evc which depends on the flow velocity of the fluid to be measured will be called a v×B component, and the v×B component is represented by Vb. The above span is a coefficient by which the magnitude V of the flow velocity of the v×B component dependent on the flow velocity of the fluid to be measured is multiplied. The above definitions of $\theta 00$ and $\theta 01$ can be rephrased such that $\theta 00$ is the angle of the vector Va with respect to the imaginary axis, and $\theta 01$ is the angle of the vector Vb with respect to the real axis.

In the arrangement of the electromagnetic flowmeter shown in FIG. 21, $\theta 00 = \theta 01 = 0$ means that the vector Va exists on the imaginary axis Im, and the vector Vb exists on the real axis Re. That is, the vectors Va and Vb are orthogonal to each other. As described above, the electromagnetic flowmeter in the above patent reference is based on the premise that the vector Va of the $\partial A/\partial t$ component is orthogonal to the vector Vb of the v×B component.

In an actual electromagnetic flowmeter, however, the above premise does not always hold. This is because, although the orthogonality between the vector Va of the $\partial A/\partial t$ component and the vector Vb of the v×B component is guaranteed, the magnetic field applied to the fluid to be measured does not have an ideal distribution from a microscopic viewpoint, and hence it must be considered from a microscopic viewpoint that the vectors Va and Vb of the macroscopic $\partial A/\partial t$ and v×B components include some distortion. Therefore, it must be considered that the vectors Va and Vb are not orthogonal to each other, or $\theta 00 \neq 0$, $\theta 01 \neq 0$, and $\theta 00 \neq \theta 01$.

As is obvious from the above description, when an electromagnetic flowmeter aims at high accuracy, the orthogonality between the vectors Va and Vb must be carefully taken into consideration. However, the electromagnetic flowmeter in the above patent reference is premised on the orthogonality between the vectors Va and Vb. If, therefore, an error occurs in the orthogonality, there is a chance that the flowmeter cannot perform accurate span correction or flow rate measurement.

The present invention has been made to solve the above problem, and has as its object to provide an electromagnetic flowmeter which automatically performs accurate span correction and can perform accurate flow rate measurement.

Means of Solution to the Problem

According the present invention, there is provided an electromagnetic flowmeter according comprising a measuring tube through which a fluid to be measured flows, an electrode which is placed in the measuring tube and detects an electromotive force generated by a magnetic field applied to the fluid and a flow of the fluid, an exciting unit which applies, to the fluid, a time-changing magnetic field asymmetrical to a first plane which includes the electrode and is perpendicular to an axial direction of the measuring tube, a signal conversion unit which extracts a ∂A/∂t component irrelevant to a flow velocity of the fluid from a resultant electromotive force of an electromotive force based on the ∂A/∂t component and an electromotive force based on a v×B component originating from the flow velocity of the fluid, and a flow rate output unit which removes a variable factor for a span as a coefficient by which a magnitude V of a flow velocity of the v×B component in the resultant electromotive force is multiplied, on the basis of the extracted ∂A/∂t component, and calculates a flow rate of the fluid from a result obtained by removing the variation factor.

Effects of the Invention

According to the present invention, a span variation element is erased by extracting a ∂A/∂t component which is irrelevant to the flow velocity of a fluid from the resultant electromotive force of the electromotive force based on the ∂A/∂t component and the electromotive force based on a v×B component originating from the flow velocity of the fluid, which are detected by the electrodes, and correcting a span as a coefficient by which a magnitude V of the flow velocity of the v×B component in the resultant electromotive force is multiplied. This makes it possible to automatically perform accurate span correction and accurate flow rate measurement.

A magnetic field is applied to the fluid with a plurality of exciting frequencies, and the amplitude and phase of each of at least two different frequency components of a resultant electromotive force detected by the electrode are obtained. This makes it possible to extract the ∂A/∂t component.

In addition, an exciting current containing two different frequency components is supplied to an exciting coil, and the amplitude and phase of two frequency components of the first and second frequencies of the resultant electromotive force detected by the electrode are obtained. This makes it possible to extract the electromotive force difference between the two frequency components as the ∂A/∂t component.

The magnetic fields with different exciting frequencies are applied from the plurality of exciting coils to the fluid, and the amplitude and phase of each of at least two different frequency components of a resultant electromotive force detected by the electrode are obtained. This makes it possible to extract the ∂A/∂t component.

The exciting currents with the first and second frequencies are respectively supplied to the first and second exciting coils at the same time, and the amplitude and phase of each of the two frequency components of the first and second frequencies of the resultant electromotive force detected by the electrode are obtained. This makes it possible to approximately extract, as the ∂A/∂t component, the electromotive force difference or an electromotive force sum between the two frequency components.

The plurality of electrodes are placed at different positions along a measuring tube axis, and the amplitude and phase of the resultant electromotive force detected by at least two electrodes, of the resultant electromotive force detected by the plurality of electrodes are obtained. This makes it possible to extract the ∂A/∂t component.

The amplitude and phase of each of the first and second resultant electromotive forces respectively detected by the first and second electrodes are obtained. This makes it possible to approximately extract, as the ∂A/∂t component, the electromotive force difference or electromotive force sum between the first and second resultant electromotive forces. Since the ∂A/∂t component can be extracted by only one exciting frequency, there is no need to use the two exciting frequencies.

BEST MODE FOR CARRYING OUT THE INVENTION

[Basic Principle]

The present invention takes into consideration that when a resultant vector Va+Vb of a vector Va of a $\partial A/\partial t$ component and a vector Vb of a v×B component is obtained from the inter-electrode electromotive force detected by the electrodes of the electromagnetic flowmeter, the vector Va is a vector which depends on only a temporal change in magnetic field but is irrelevant to the flow velocity of the fluid to be measured and the vector Vb is a vector which changes in proportion to the flow velocity of the fluid to be measured regardless of whether the vectors Va and Vb are orthogonal to each other.

Figure 21:
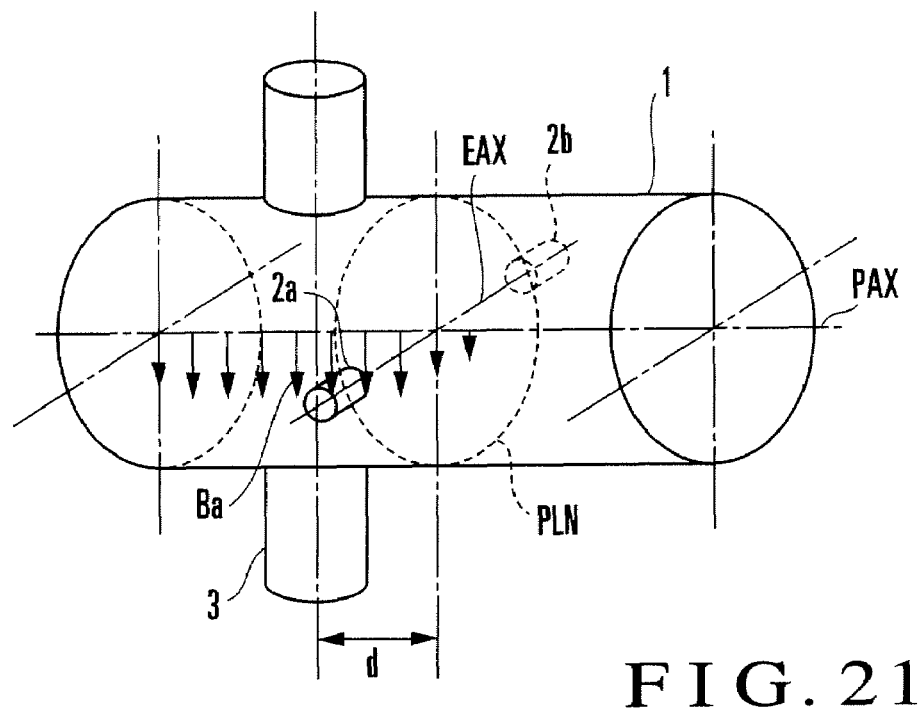
FIG. 21 is a block diagram for explaining the principle of a conventional electromagnetic flowmeter.
Figure 22:
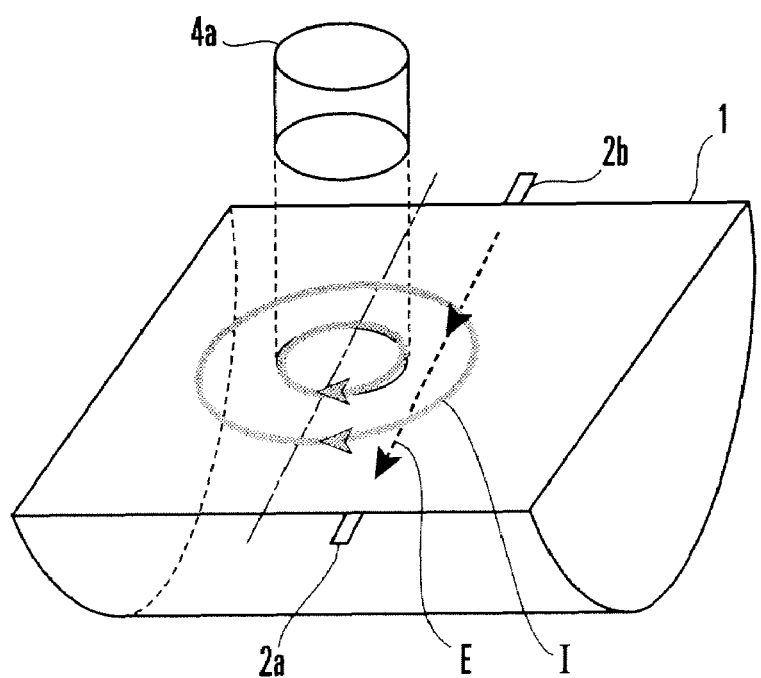
FIG. 22 is a view showing eddy currents and inter-electrode electromotive forces when the flow rate of a fluid to be measured is 0 in a conventional electromagnetic flowmeter.
Figure 23:
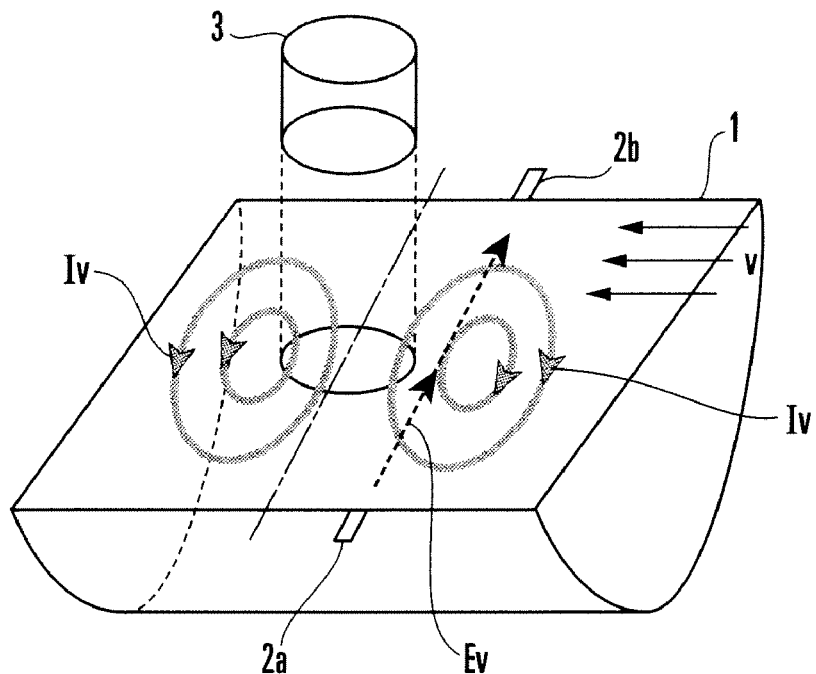
FIG. 23 is a view showing eddy currents and inter-electrode electromotive forces when the flow rate of a fluid to be measured is not 0 in a conventional electromagnetic flowmeter.
Figure 24:
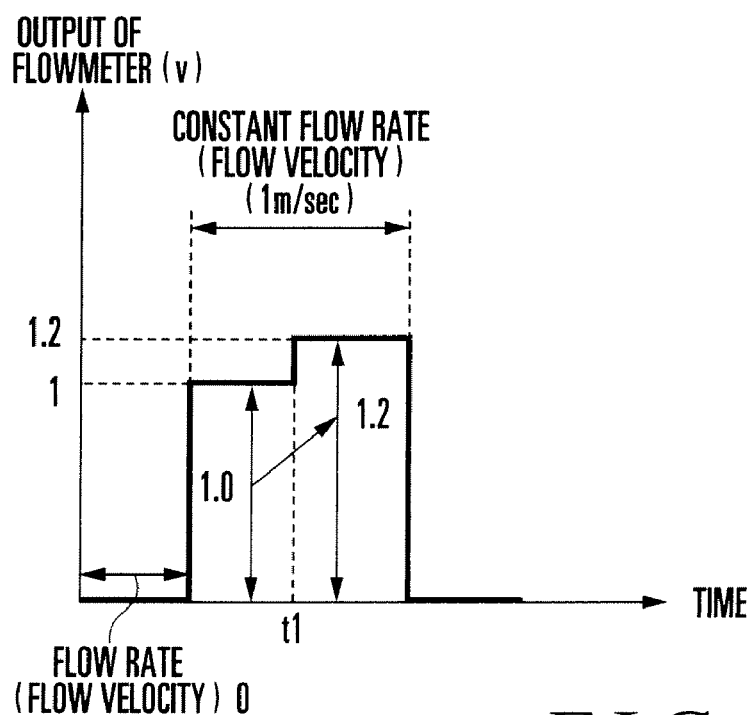
FIG. 24 is a view for explaining a span shift in the electromagnetic flowmeter.
Figure 25:
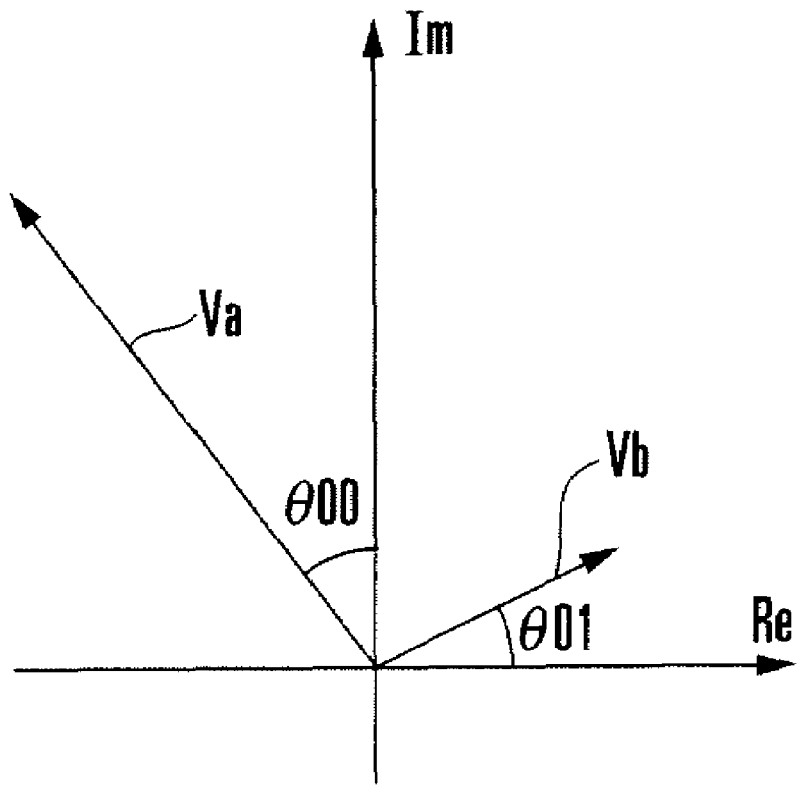
FIG. 25 is a view for explaining problems in the conventional electromagnetic flowmeter.

According to the present invention, the vector Va of the $\partial A/\partial t$ component is extracted from the resultant vector Va+Vb, and the span variation element contained in the vector Vb of the v×B component in the resultant vector Va+Vb is erased by using the vector Va. The flow rate of the fluid to be measured is calculated on the basis of the v×B component from which this span variation element is erased. It is important that extracting the vector Va of the $\partial A/\partial t$ component allows the vectors Va and Vb to be separately handled regardless of whether the vectors Va and Vb are orthogonal to each other. The conventional electromagnetic flowmeter shown in FIG. 21 is based on the premise that the vectors Va and Vb are orthogonal to each other, and hence is not designed to extract the vector Va or Vb from the resultant vector Va+Vb.

The basic principle of the present invention for actually correcting a span will be described next with reference to FIGS. 1A to 1C. As in the electromagnetic flowmeter shown in FIG. 21, when a magnetic field asymmetric on the front and rear sides of a measuring tube which are bordered on a plane which is perpendicular to the measuring tube axis and includes electrodes, with the plane serving as a boundary of the measuring tube, is applied to a fluid to be measured, the vector mapped on a complex plane on the basis of the amplitudes of the inter-electrode electromotive force and the phase difference between them, which are measured by the asymmetric excitation, corresponds to the resultant vector Va+Vb of the vector Va of the $\partial A/\partial t$ component and the vector Vb of the v×B component.

$$Va = r\omega \cdot \exp(j \cdot \theta\omega) \cdot C \cdot \omega \quad (21)$$

$$Vb = rv \cdot \exp(j \cdot \theta v) \cdot C \cdot V \quad (22)$$

Figure 1A:
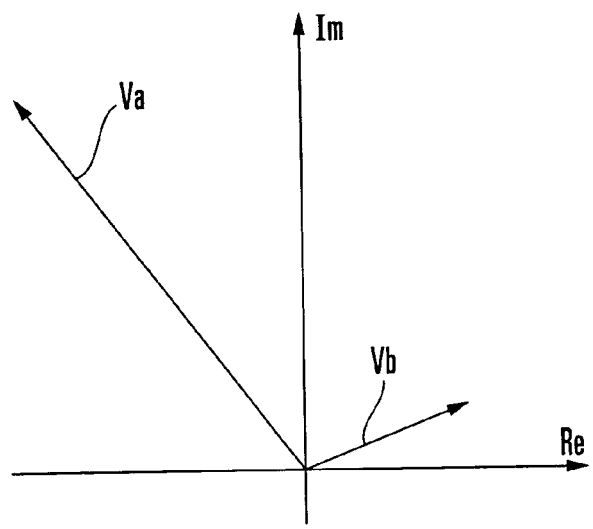
FIG. 1A is a view showing a ∂A/∂t component vector and a v×B component vector.

FIG. 1A shows the vectors Va and Vb. The vector Va of the $\partial A/\partial t$ component is the electromotive force generated by a change in magnetic field, and hence has a magnitude proportional to an exciting angular frequency $\omega$. Letting $r\omega$ be a known proportional constant portion corresponding to the magnitude of the vector Va, and $\theta\omega$ be the direction of the vector Va, C is given as an element which changes, like a magnetic field shift, i.e., a span variation element. In addition, the vector Vb of the v×B component is the electromotive force generated by the movement of the fluid to be measured in the measuring tube, and hence has a magnitude proportional to the magnitude V of the flow velocity. In this case, letting rv be a known proportional constant portion corresponding the magnitude of the vector Vb, and $\theta v$ be the direction of the vector, C is given as a span variation element. Note that C of the vector Va represented by equation (21) and C of the vector Vb represented by equation (22) are identical elements.

A factor for a span shift is a change in the span variation element C. Therefore, obtaining the flow velocity of the fluid to be measured by a signal conversion expression from which the span variation element C is erased makes it possible to substantially implement automatic span correction. The following two methods are available as specific methods for span correction.

According to the first correction method, the span variation element C is erased by normalizing the vector Vb of the v×B component with the vector Va of the $\partial A/\partial t$ component, and automatic span correction in flow rate measurement is implemented by a signal conversion expression associated with the magnitude V of the flow velocity based on the normalized vectors. The following mathematically represents the normalization of the first correction method:

$$Vb/Va = \{rv \cdot \exp(j \cdot \theta v) \cdot C \cdot V\}/\{r\omega \cdot \exp(j \cdot \theta\omega) \cdot C \cdot \omega\} \quad (23)$$
$$= (rv/r\omega) \cdot \exp\{j \cdot (\theta v - \theta\omega)\} \cdot V/\omega$$

$$|Vb/Va| = (rv/r\omega) \cdot V/\omega \quad (24)$$

Figure 1B:
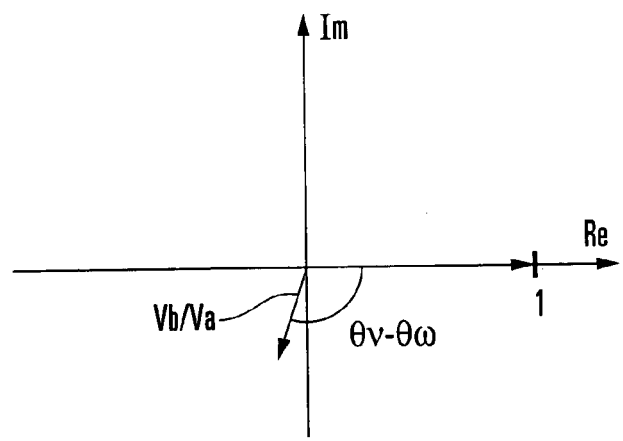
FIG. 1B is a view showing a vector obtained by normalizing the v×B component vector with the ∂A/∂t component vector.
Figure 1C:
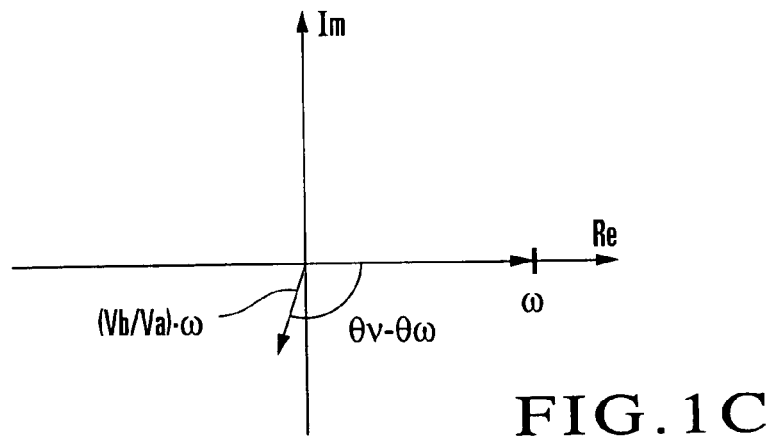
FIG. 1C is a view showing a vector obtained by multiplying the vector in FIG. 1B by an exciting angular frequency.

FIG. 1B shows the vector obtained by normalizing the vector Vb of the v×B component with the vector Va of the $\partial A/\partial t$ component. Note that the vector shown in FIG. 1C is the vector obtained by erasing the exciting angular frequency $\omega$ from the right side of equation (23) by multiplying the vector in FIG. 1B by the exciting angular frequency $\omega$.

According to the second correction method, the span variation element C is erased by normalizing the resultant vector Va+Vb with the vector Va of the $\partial A/\partial t$ component, and automatic span correction in flow rate measurement is implemented by using a signal conversion expression associated with the magnitude V of the flow velocity based on the normalized vector. The following mathematically represents the normalization of the second correction method:

$$(Va+Vb)/Va = \{r\omega \cdot \exp(j \cdot \theta\omega) \cdot C \cdot \omega + rv \cdot \exp(j \cdot \theta v) \cdot C \cdot V\}/\{r\omega \cdot \exp(j \cdot \theta\omega) \cdot C \cdot \omega\} \quad (25)$$
$$= 1 + (rv/r\omega) \cdot \exp\{j \cdot (\theta v - \theta\omega)\} \cdot V/\omega$$

$$|(Va+Vb)/Va - 1| = (rv/r\omega) \cdot V/\omega \quad (26)$$

The second correction method provides more practical processing than the first correction method. This is because the vector Vb of the v×B component cannot be directly obtained from the inter-electrode electromotive force obtained by the electromagnetic flowmeter, and the vector that can be obtained from the inter-electrode electromotive force is Va+Vb.

The following two methods are available as methods of extracting the vector Va of the ∂A/∂t component. The first extraction method is a method of extracting the vector Va by applying the magnetic fields with the plurality of exciting frequencies to the fluid to be measured, and using the frequency difference between the plurality of components contained in the inter-electrode electromotive force. As described above, the complex vector that can be directly obtained from the inter-electrode electromotive forces is the resultant vector Va+Vb, and the vectors Va and Vb cannot be directly measured. It is therefore noted that the magnitude of the vector Va of the ∂A/∂t component is proportional to the exciting angular frequency ω, and the vector Vb of the v×B component does not depend on the exciting angular frequency ω. More specifically, the exciting coil applies the magnetic field containing two components having the same magnitude and different frequencies to the fluid to be measured. This makes it possible to obtain the difference between the resultant vector Va+Vb of the first frequency component and the resultant vector Va+Vb of the second frequency component. This difference corresponds to a vector representing only a change in the magnitude of the vector Va, which therefore allows to extract the vector Va.

The second extraction method is a method which can be applied to an electromagnetic flowmeter including at least two pairs of electrodes placed to face each other through a coil plane including the axis of the exiting coil. This method extracts the vector Va by using the output difference between the electrodes. In the second extraction method, it is noted that the direction of the ∂A/∂t component generated in the first inter-electrode electromotive force is opposite to the direction of the ∂A/∂t component generated in the second inter-electrode electromotive force, and the direction of the v×B component generated in the first inter-electrode electromotive force is the same as the direction of the v×B component generated in the second inter-electrode electromotive force.

More specifically, when the first and second electrodes are uniformly placed on a coil plane to obtain the difference between the resultant vector Va+Vb of the first inter-electrode electromotive force and the result vector Va+Vb of the second inter-electrode electromotive force, the v×B component generated in the first inter-electrode electromotive force cancels out the v×B component generated in the second inter-electrode electromotive force. This makes it possible to extract the vector Va of the sum of the ∂A/∂t component generated in the first inter-electrode electromotive force and the ∂A/∂t component generated in the second inter-electrode electromotive force.

Using the normalization result obtained by the first correction method of normalizing the vector Vb of the v×B component with the vector Va of the ∂A/∂t component makes it possible to calculate the magnitude V of the flow velocity of the fluid to be measured as follows:

$$V=(r\omega/rv)\cdot|Vb/Va|\cdot\omega \quad (27)$$

In addition, using the normalization result obtained by the second correction method of normalizing the resultant vector Va+Vb with the vector Va of the ∂A/∂t component makes it possible to calculate the magnitude V of the flow velocity of the fluid to be measured as follows:

$$V=(r\omega/rv)\cdot\{|(Va+Vb)/Va-1|\}\cdot\omega \quad (28)$$

According to the above principle, the magnitude V of the flow velocity can be measured independently of the span variation element C such as a magnetic field shift, and hence automatic span correction can be substantially implemented. In all embodiments of the present invention, the ∂A/∂t component and the resultant component of the ∂A/∂t and v×B components can be obtained only by single measurement in an exciting state without switching exciting states. Accordingly, the automatic correction can be implemented at higher speed than measurement by switching the exciting states.

First Embodiment

The first embodiment of the present invention will be described in detail below with reference to the accompanying drawings. This embodiment uses the first extraction method of the methods described in association with the basic principle as a method of extracting a vector Va of a ∂A/∂t component, and uses the second correction method as a span correction method. An electromagnetic flowmeter according to this embodiment includes one exciting coil and a pair of electrodes, and has the same arrangement as that of the conventional electromagnetic flowmeter shown in FIG. 21 except for the signal processing system. The principle of this embodiment will therefore be described by using reference numerals in FIG. 21.

Referring to FIG. 21, of a magnetic field Ba generated by the exciting coil 3, a magnetic field component (magnetic flux density) B6 orthogonal to both an electrode axis EAX and measuring tube axis PAX on the electrode axis EAX connecting the electrodes 2a and 2b is given by $$B6=b6\cdot\cos(\omega 0 t-\theta 6)+b6\cdot\cos(\omega 1\cdot t-\theta 6) \quad (29)$$

In equation (29), ω0 and ω1 are different angular frequencies, b6 is the amplitude of the angular frequency ω0 of the magnetic flux density B6 and the amplitude of the angular frequency ω1, and θ6 is a phase difference (phase lag) between the angular frequencies ω0 and ω0·t, and a phase difference between the angular frequencies ω1 and ω1·t. The magnetic flux density B6 will be referred to as the magnetic field B6 hereinafter.

In this case, letting E50 be the electromotive force of the angular frequency ω0 component of an overall inter-electrode electromotive force obtained by combining an electromotive force obtained by transforming, into a complex vector, the inter-electrode electromotive force originating from a temporal change in magnetic field, and an electromotive force obtained by transforming, into a complex vector, the inter-electrode electromotive force originating from the flow velocity of the fluid. In this case, the inter-electrode electromotive force E50 is expressed by the following equation similar to equation (20):

$$E50=rk\cdot\omega 0\cdot b6\cdot\exp\{j\cdot(\pi/2+\theta 6+\theta 00)\}+rkv\cdot b6\cdot\exp\{j\cdot(\theta 6+\theta 01)\} \quad (30)$$

Letting E51 be the electromotive force of the angular frequency ω1 component of an overall inter-electrode electromotive force obtained by combining an electromotive force obtained by transforming, into a complex vector, the inter-electrode electromotive force originating from a temporal change in magnetic field, and an electromotive force obtained by transforming, into a complex vector, the inter-electrode electromotive force originating from the flow velocity of the fluid. In this case, the inter-electrode electromotive force E51 is expressed by the following equation similar to equation (20):

$$E51 = rk \cdot \omega 1 \cdot b6 \cdot \exp\{j \cdot (\pi/2 + \theta 6 + \theta 00)\} + rkv \cdot b6 \cdot \exp\{j \cdot (\theta 6 + \theta 01)\} \quad (31)$$

The relationship between an angle $\theta 00$ of the vector Va with respect to the imaginary axis and an angle $\theta 01$ of a vector Vb with respect to the real axis is defined as $\theta 01 = \theta 00 + \Delta\theta 01$, and substituting $\theta 01 = \theta 00 + \Delta\theta 01$ and equation (18) into equations (30) and (31) yields the inter-electrode electromotive forces E50 and E51 represented by equations (32) and (33):

$$\begin{aligned} E50 &= rk \cdot \omega 0 \cdot b6 \cdot \exp\{j \cdot (\pi/2 + \theta 6 + \theta 00)\} + \\ &\quad \gamma \cdot rk \cdot V \cdot b6 \cdot \exp\{j \cdot (\theta 6 + \theta 00 + \Delta\theta 01)\} \\ &= rk \cdot b6 \cdot \exp\{j \cdot (\theta 6 + \theta 00)\} \cdot \\ &\quad \{\omega 0 \cdot \exp(j \cdot \pi/2) + \gamma \cdot V \cdot \exp(j \cdot \Delta\theta 01)\} \end{aligned} \quad (32)$$

$$\begin{aligned} E51 &= rk \cdot \omega 1 \cdot b6 \cdot \exp\{j \cdot (\pi/2 + \theta 6 + \theta 00)\} + \\ &\quad \gamma \cdot rk \cdot V \cdot b6 \cdot \exp\{j \cdot (\theta 6 + \theta 00 + \Delta\theta 01)\} \\ &= rk \cdot b6 \cdot \exp\{j \cdot (\theta 6 + \theta 00)\} \cdot \\ &\quad \{\omega 1 \cdot \exp(j \cdot \pi/2) + \gamma \cdot V \cdot \exp(j \cdot \Delta\theta 01)\} \end{aligned} \quad (33)$$

Letting EdA5 be the result obtained by multiplying the difference between the inter-electrode electromotive forces E50 and E51 by $\omega 0/(\omega 0 - \omega 1)$, equation (34) holds:

$$\begin{aligned} EdA5 &= (E50 - E51) \cdot \omega 0/(\omega 0 - \omega 1) \\ &= rk \cdot b6 \cdot \exp\{j \cdot (\theta 6 + \theta 00)\} \cdot \\ &\quad \{\omega 0 \cdot \exp(j \cdot \pi/2) + \gamma \cdot V \cdot \exp(j \cdot \Delta\theta 01) - \\ &\quad \omega 1 \cdot \exp(j \cdot \pi/2) - \gamma \cdot V \cdot \exp(j \cdot \Delta\theta 01)\} \cdot \\ &\quad \omega 0/(\omega 0 - \omega 1) \\ &= rk \cdot \omega 0 \cdot b6 \cdot \exp\{j \cdot (\pi/2 + \theta 6 + \theta 00)\} \end{aligned} \quad (34)$$

Figure 2:
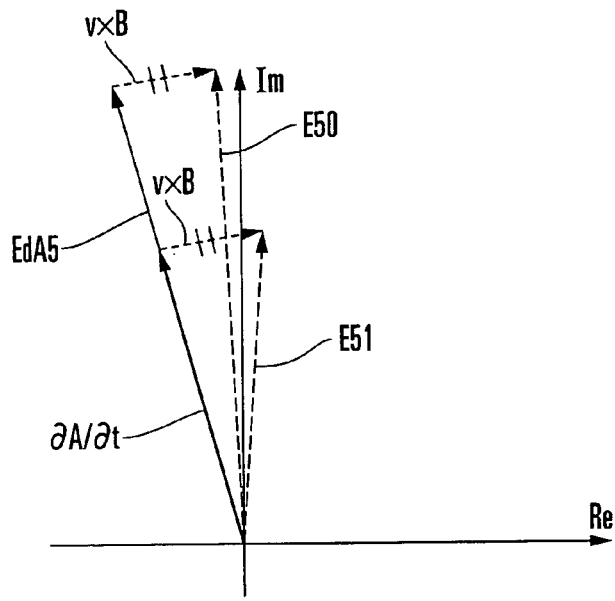
FIG. 2 is a view expressing inter-electrode electromotive forces and an electromotive force difference in the form of complex vectors in the first embodiment of the present invention.

The electromotive force difference EdA5 is irrelevant to a magnitude V of the flow velocity, and hence is only the component generated by $\partial A/\partial t$. The electromotive force difference EdA5 is used to normalize a coefficient (span) by which the magnitude V of the flow velocity of the v×B component in the inter-electrode electromotive force E50 (the resultant vector Va+Vb) is multiplied. FIG. 2 is a view expressing the above inter-electrode electromotive forces E50 and E51 and the electromotive force difference EdA5 in the form of complex vectors. Referring to FIG. 2, reference symbol Re denotes a real axis; and Im, an imaginary axis. Referring to FIG. 2, reference symbol v×B denotes a v×B component $rk \cdot b6 \cdot \exp\{j \cdot (\theta 1 + \theta 00)\} \cdot \gamma V \cdot \exp(j \cdot \Delta\theta 01)$ of the inter-electrode electromotive forces E50 and E51; and $\partial A/\partial t$, a $\partial A/\partial t$ component $rk \cdot b6 \cdot \exp\{j \cdot (\theta 6 + \theta 00)\} \cdot \omega 1 \cdot \exp(j \cdot p/2)$ of the inter-electrode electromotive force E51. To be precise, the electromotive force difference EdA5 is the value obtained by multiplying the electromotive force difference between the inter-electrode electromotive forces E50 and E51 by $\omega 0/(\omega 0 - \omega 1)$. However, the reason why this electromotive force difference is multiplied by $\omega 0/(\omega 0 - \omega 1)$ is to facilitate the development of an equation.

Letting En5 be the result obtained by normalizing the inter-electrode electromotive force E50 given by equation (32) with the electromotive force difference EdA5 given by equation (34) and multiplying the normalization result by $\omega 0$, the normalized electromotive force En5 is given by equation (35):

$$\begin{aligned} En5 &= (E50/EdA5) \cdot \omega 0 \\ &= rk \cdot b6 \cdot \exp\{j \cdot (\theta 6 + \theta 00)\} \cdot \\ &\quad \{\omega 0 \cdot \exp(j \cdot \pi/2) + \gamma \cdot V \cdot \exp(j \cdot \Delta\theta 01)\}/ \\ &\quad [rk \cdot \omega 0 \cdot b6 \cdot \exp\{j \cdot (\pi/2 + \theta 6 + \theta 00)\}] \cdot \omega 0 \\ &= \omega 0 + [\gamma \cdot \exp\{j \cdot (-\pi/2 + \Delta\theta 01)\}] \cdot V \end{aligned} \quad (35)$$

Figure 3:
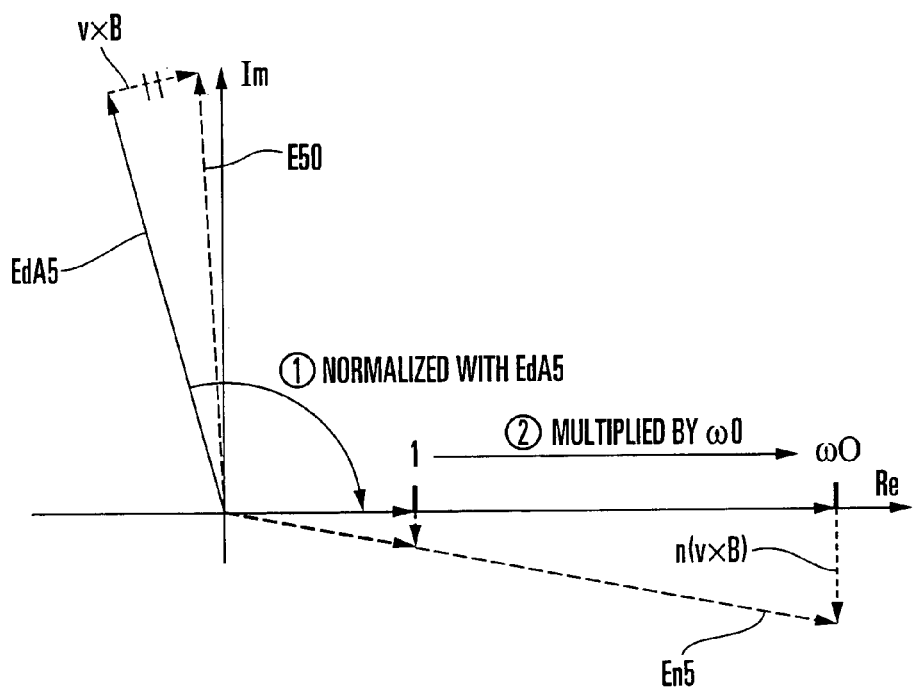
FIG. 3 is a view expressing the manner of normalization processing in the form of complex vectors in the first embodiment of the present invention.

The second term of the right side of equation (35) is the term obtained by normalizing the component generated by v×B with the component generated by $\partial A/\partial t$. FIG. 3 is a view expressing the manner of the above normalization processing in the form of complex vectors. Referring to FIG. 3, reference symbol v×B denotes a v×B component $rk \cdot b6 \cdot \exp\{j \cdot (\theta 6 + \theta 00)\} \cdot \gamma \cdot V \cdot \exp(j \cdot \Delta\theta 01)$ of the inter-electrode electromotive force E50; and n(v×B), a normalized v×B component $[\gamma \cdot \exp\{j \cdot (-p/2 + \Delta\theta 01)\}] \cdot V$. The reason why the result obtained by normalizing the inter-electrode electromotive force E50 with the electromotive force difference EdA5 is multiplied by $\omega 0$ is to erase the exciting angular frequency $\omega 0$ from the second term of the right side associated with the magnitude V of the flow velocity. According to equation (35), the complex coefficient by which the magnitude V of the flow velocity is multiplied has the magnitude of $\gamma$ and the angle of $-p/2 + \Delta\theta 01$ with respect to the real axis. The coefficient $\gamma$ and the angle $\Delta\theta 01$ are constants which can be obtained in advance by calibration and the like, and the second term of the right side of equation (35) remains constant unless the flow velocity of the fluid to be measured changes.

Normalizing the v×B component by using the $\partial A/\partial t$ component makes it possible to implement span correction of automatically correcting an error due to a magnetic field shift or phase change. According to equation (35), the magnitude V of the flow velocity is expressed by $$\begin{aligned} V &= |(En5 - \omega 0)/[\gamma \cdot \exp\{j \cdot (-\pi/2 + \Delta\theta 01)\}]| \\ &= |(En5 - \omega 0)|/\gamma \end{aligned} \quad (36)$$

Table 1 shows the correspondence relationship between the constants and variables used in the basic principle described above and the constants and variables in this embodiment. As is obvious from Table 1, this embodiment is an example of specifically implementing the basic principle described above.

TABLE 1

Correspondence Relationship between
Basic Principle and First Embodiment

| Constants and Variables in<br>Basic Principle | Constants and Variables in<br>First Embodiment |
| --- | --- |
| $r\omega$ | 1 |
| $rv$ | $\gamma$ |
| $\theta\omega$ | $\pi/2$ |
| $\theta v$ | $\Delta\theta 01$ |
| C | $rk \cdot b6 \cdot \exp\{j(\theta 6 + \theta 00)\}$ |

Figure 4:
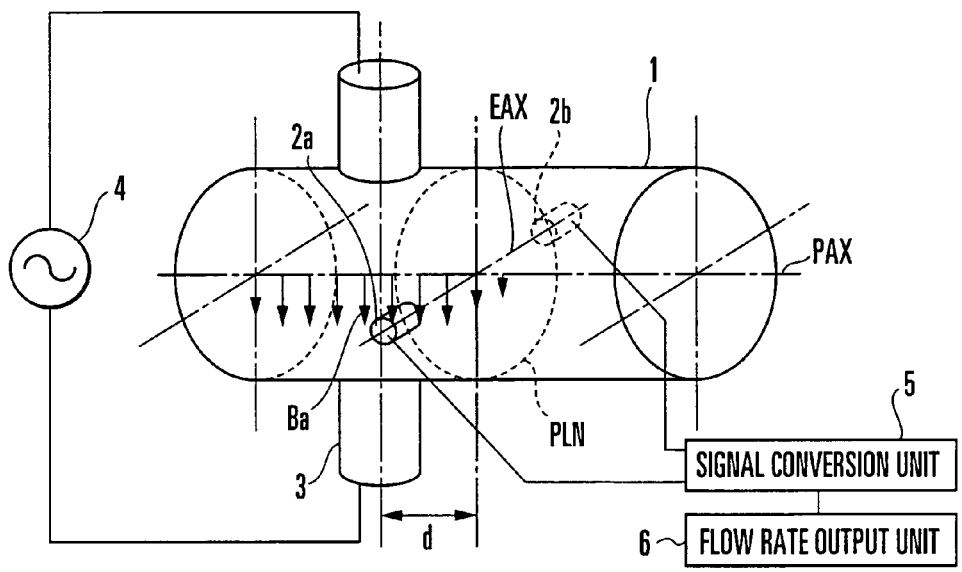
FIG. 4 is a block diagram showing the arrangement of an electromagnetic flowmeter according to the first embodiment of the present invention.

A specific arrangement of the electromagnetic flowmeter of this embodiment and its operation will be described next. FIG. 4 is a block diagram showing the arrangement of the electromagnetic flowmeter according to this embodiment. The same reference numerals as in FIG. 4 denote the same components in FIG. 21. The electromagnetic flowmeter according to this embodiment includes a measuring tube 1, electrodes 2a and 2b, an exciting coil 3 placed at a position spaced apart by an offset distance d in the axial direction from a plane PLN which includes the electrodes 2a and 2b and is perpendicular to the direction of a measuring tube axis PAX, a power supply unit 4 which supplies an exciting current to the exciting coil 3, a signal conversion unit 5 which obtains the amplitudes and phases of the two frequency components of the first and second frequencies of the resultant electromotive force detected by the electrodes 2a and 2b, and extracts the electromotive force difference between the two frequency components as the ∂A/∂t component on the basis of the obtained amplitudes and phases, and a flow rate output unit 6 which removes a variation factor for a span contained in the v×B component in the first frequency component or the v×B component in the second frequency component of the resultant electromotive force detected by the electrodes 2a and 2b, on the basis of the extracted ∂A/∂t component, and calculates the flow rate of the fluid to be measured from the result obtained by removing the variation factor. The exciting coil 3 and the power supply unit 4 constitute an exciting unit which applies a time-changing magnetic field asymmetric to the plane PLN to the fluid to be measured.

The power supply unit 4 supplies an exciting current containing the sine wave components of the first angular frequency $\omega 0$ and the second angular frequency $\omega 1$, to the exciting coil 3. In this case, the amplitudes of the angular frequency $\omega 0$ component and the angular frequency $\omega 1$ component in the exciting current axe the same.

Figure 5:
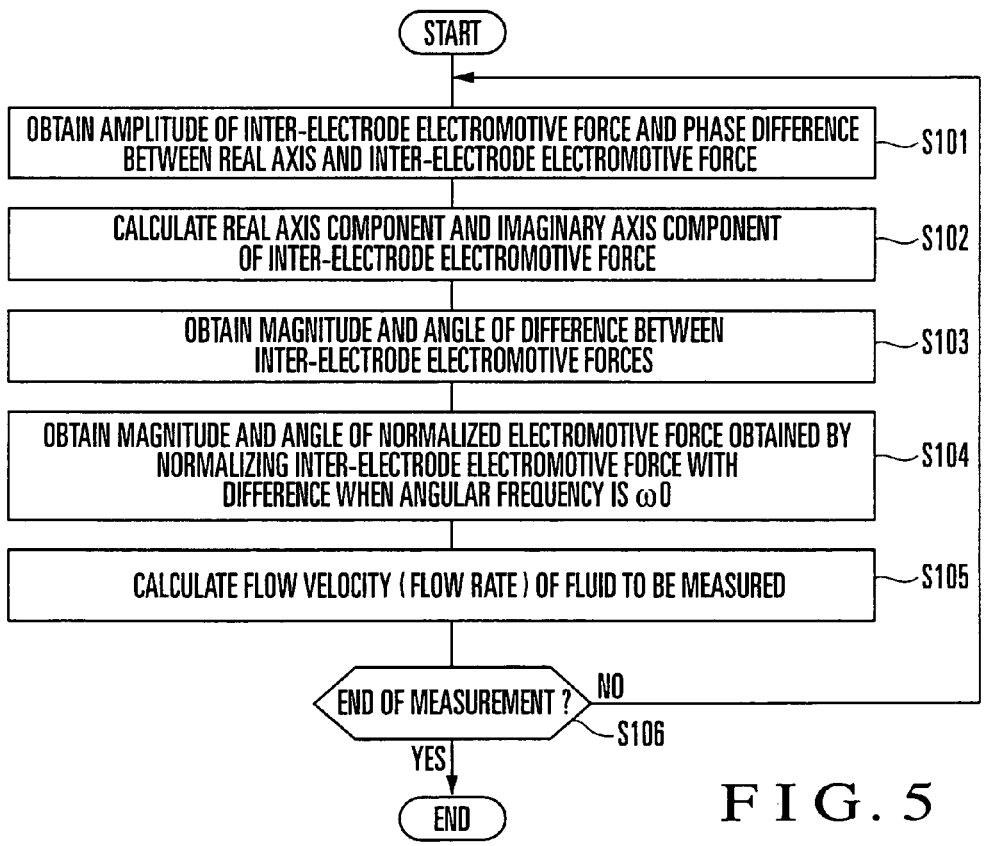
FIG. 5 is a flowchart showing the operations of a signal conversion unit and flow rate output unit according to the first embodiment of the present invention.

FIG. 5 is a flowchart showing the operations of the signal conversion unit 5 and flow rate output unit 6. First of all, the signal conversion unit 5 causes a phase detector (not shown) to obtain an amplitude r50 of the electromotive force E50 of the angular frequency $\omega 0$ of the electromotive force between the electrodes 2a and 2b, and obtain a phase difference $\phi 50$ between the real axis and the inter-electrode electromotive force E50. Subsequently, the signal conversion unit 5 causes the phase detector (not shown) to obtain an amplitude r51 of the electromotive force E51 of the angular frequency $\omega 1$ component of the electromotive force between the electrodes 2a and 2b, and obtain a phase difference $\phi 51$ between the real axis and the inter-electrode electromotive force E51 (step S101 in FIG. 5). The inter-electrode electromotive forces E50 and E51 can also separate the frequency by a bandpass filter. However, actually, they can easily separate the frequency into two angular frequencies by using a comb-shaped digital filter called a "comb filter".

The signal conversion unit 5 then calculates a real axis component E50x and imaginary axis component E50y of the inter-electrode electromotive force E50, and a real axis component E51x and imaginary axis component E51y of the inter-electrode electromotive force E51 according to the following equations (step S102):

$$E50x = r50 \cdot \cos(\phi 50) \quad (37)$$

$$E50y = r50 \cdot \sin(\phi 50) \quad (38)$$

$$E51x = r51 \cdot \cos(\phi 51) \quad (39)$$

$$E51y = r51 \cdot \sin(\phi 51) \quad (40)$$

After the calculation of equations (37) to (40), the signal conversion unit 5 obtains the magnitude and angle of the electromotive force difference EdA5 between the inter-electrode electromotive forces E50 and E51 (step S103). The processing in step S103 corresponds to the processing of obtaining a ∂A/∂t component and a v×B component, and is equivalent to the calculation of equation (34). The signal conversion unit 5 calculates a magnitude |EdA5| of the electromotive force difference EdA5 between the inter-electrode electromotive forces E50 and E51 according to the following equation:

$$|EdA5| = \{(E50x - E51x)^2 + (E50y - E51y)^2\}^{1/2} \cdot \omega 0/(\omega 0 - \omega 1) \quad (41)$$

The signal conversion unit 5 then calculates an angle ∠EdA5 of the electromotive force difference EdA5 with respect to the real axis according to the following equation:

$$\angle EdA5 = \tan^{-1}\{(E50y - E51y)/(E50x - E51x)\} \quad (42)$$

With the above operation, the processing in step S103 is complete.

The flow rate output unit 6 then obtains the magnitude and angle of the normalized electromotive force En5 obtained by normalizing the inter-electrode electromotive force E50 with the electromotive force difference EdA5 (step S104). The processing in step S104 is equivalent to the calculation of equation (35). The flow rate output unit 6 calculates a magnitude |En5| of the normalized electromotive force En5 according to the following equation:

$$|En5| = (r50/|EdA5|) \cdot \omega 0 \quad (43)$$

The flow rate output unit 6 also calculates an angle ∠En5 of the normalized electromotive force En5 with respect to the real axis according to the following equation:

$$\angle En5 = \phi 50 - \angle EdA5 \quad (44)$$

With this operation, the processing in step S104 is complete.

The flow rate output unit 6 then calculates the magnitude V of the flow velocity of the fluid to be measured (step S105). The processing in step S105 is equivalent to the calculation of equation (36). The flow rate output unit 6 calculates a real axis component En5x of (En5−$\omega 0$) and an imaginary axis component En5y of (En5−$\omega 0$) according to the following equations:

$$En5x = |En5|\cos(\angle En5) - \omega 0 \quad (45)$$

$$En5y = |En5|\sin(\angle En5) \quad (46)$$

The flow rate output unit 6 then calculates the magnitude V of the flow velocity of the fluid to be measured according to the following equation:

$$V = (En5x^2 + En5y^2)^{1/2}/\gamma \quad (47)$$

With this operation, the processing in step S105 is complete.

The signal conversion unit 5 and the flow rate output unit 6 perform the processing in steps S101 to S105 described above in a cycle until, for example, the end of the measurement is designated by the operator (YES in step S106).

As described above, this embodiment is configured to apply the magnetic field with two components having the same magnitude and different frequencies from the exciting coil 3 to the fluid to be measured, and extract the electromotive force difference EdA5 (the vector Va of the ∂A/∂t component) from the electromotive forces E50 and E51 of the angular frequencies ω0 and ω1 components of the electromotive force between the electrodes 2a and 2b. A span by which the magnitude V of the flow velocity of the v×B component in the inter-electrode electromotive force E50 (resultant vector Va+Vb) is normalized by using the electromotive force difference EdA5, thereby erasing the span variation element. Therefore, the embodiment can automatically perform accurate span correction and can execute accurate flow rate measurement.

Note that this embodiment has exemplified the case of normalizing the component E50 of the angular frequency ω0 component of the inter-electrode electromotive force. However, the present invention is not limited to this. The component E51 of the angular frequency ω1 component may be normalized.

Second Embodiment

The second embodiment of the present invention will be described next. This embodiment is the same as the first embodiment except that one exciting coil is added to the electromagnetic flowmeter, and uses the first extraction method as a method of extracting a vector Va of a ∂A/∂t component and the second correction method as a span correction method. That is, the electromagnetic flowmeter of this embodiment includes two exciting coils and a pair of electrodes. If the second exciting coil to be newly added is placed on the same side as the first exciting coil, the resultant arrangement is a redundant arrangement of the first embodiment. Therefore, the second exciting coil needs to be placed on a side different from that of the first exciting coil through a plane including the electrodes.

Figure 6:
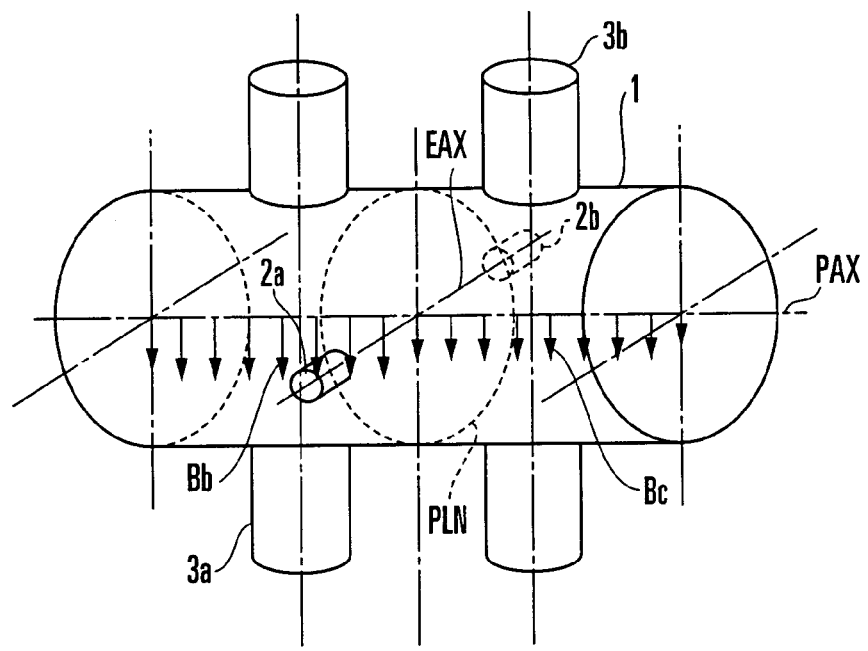
FIG. 6 is a block diagram for explaining the principle of an electromagnetic flowmeter according to the second embodiment of the present invention.

FIG. 6 is a block diagram for explaining the principle of the electromagnetic flowmeter of this embodiment. This electromagnetic flowmeter includes a measuring tube 1, electrodes 2a and 2b, a first exciting coil 3a and second exciting coil 3b which apply, to a fluid to be measured, time-changing magnetic fields asymmetric on the front and rear sides of the measuring tube 1 which are bordered on a plane PLN which is perpendicular to the direction of a measuring tube axis PAX and includes the electrodes 2a and 2b, with the plane PLN serving as a boundary of the measuring tube 1. The first exciting coil 3a is placed at a position spaced apart from the plane PLN by an offset distance d1 to, for example, the downstream side. The second exciting coil 3b is placed at a position spaced apart from the plane PLN by an offset distance d2 to, for example, the upstream side so as to face the first exciting coil 3a through the plane PLN.

Assume that a magnetic field component (magnetic flux density) B7, of a magnetic field Bb generated from the first exciting coil 3a, which is orthogonal to both an electrode axis EAX connecting the electrodes 2a and 2b and a measuring tube axis PAX on the electrode axis EAX, and a magnetic field component (magnetic flux density) B8, of a magnetic field Bc generated from the second exciting coil 3b, which is orthogonal to both the electrode axis EAX and the measuring tube axis PAX on the electrode axis EAX are given by $$B7 = b7 \cdot \cos(\omega 1 \cdot t - \theta 7) \tag{48}$$

$$B8 = b8 \cdot \cos(\omega 2 \cdot t - \theta 8) \tag{49}$$

In equations (48) and (49), ω1 and ω2 are different angular frequencies, b7 and b8 are the amplitudes of the magnetic flux densities B7 and B8, θ7 is a phase difference (phase lag) between the magnetic flux density B7 and ω1·t, and θ8 is a phase difference between the magnetic flux density B8 and ω2·t. The magnetic flux densities B7 and B8 will be respectively referred to as the magnetic fields B7 and B8 hereinafter.

Figure 7:
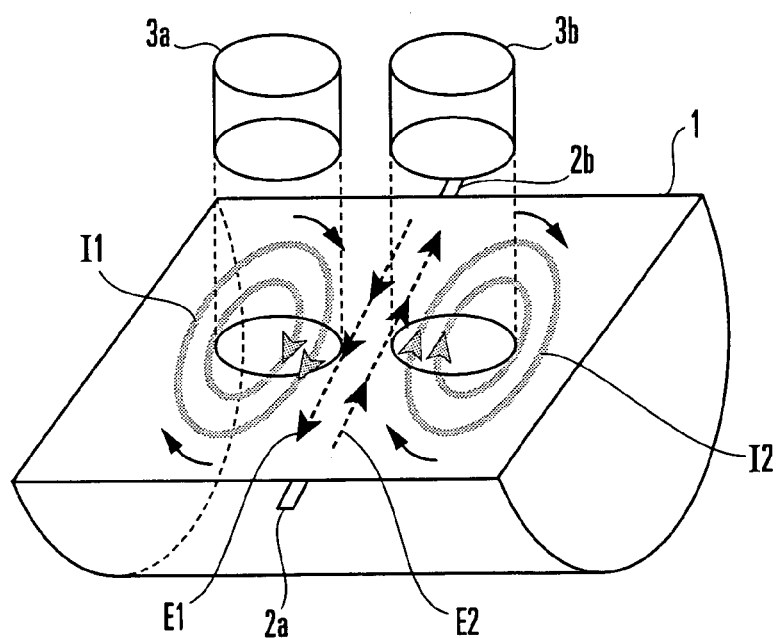
FIG. 7 is a view showing eddy currents and inter-electrode electromotive forces when the flow rate of a fluid to be measured is 0 in the second embodiment of the present invention.

If the flow velocity of the fluid to be measured is 0, a generated eddy current is only a component originating from a change in magnetic field. An eddy current I1 due to a change in the magnetic field Bb and an eddy current I2 due to a change in the magnetic field Bc are directed as shown in FIG. 7. Therefore, an inter-electrode electromotive force E1 which is generated by a change in the magnetic field Bb and is irrelevant to the flow velocity and an inter-electrode electromotive force E2 which is generated by a change in the magnetic field Bc and is irrelevant to the flow velocity are directed opposite to each other within a plane including the electrode axis EAX and the measuring tube axis PAX, as shown in FIG. 7.

Figure 8:
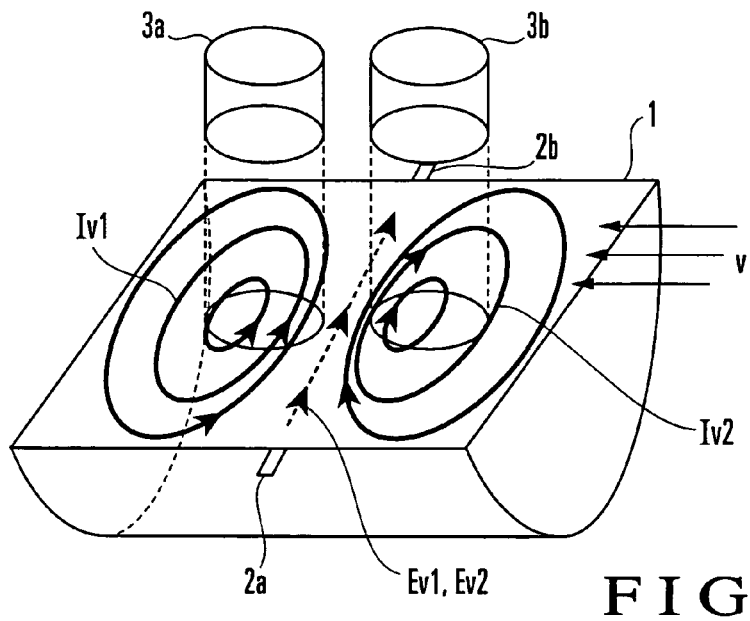
FIG. 8 is a view showing eddy current and inter-electrode electromotive forces when the flow rate of a fluid to be measured is 0 in the second embodiment of the present invention.

If the flow velocity of the fluid to be measured is V(V≠0), components v×Bb and v×Bc originating from a flow velocity vector v of the fluid to be measured are generated in the generated eddy currents in addition to the eddy currents I1 and I2 generated when the flow velocity is 0. For this reason, an eddy current Iv1 originating from the flow velocity vector v and the magnetic field Bb and an eddy current Iv2 originating from the flow velocity vector v and the magnetic field Bc are directed as shown in FIG. 8. Consequently, an inter-electrode electromotive force Ev1 generated by the flow velocity vector v and the magnetic field Bb and an inter-electrode electromotive force Ev2 generated by the flow velocity vector v and the magnetic field Bc have the same direction.

Considering the directions of the inter-electrode electromotive forces described with reference to FIGS. 7 and 8, letting E61 be an electromotive force of the angular frequency ω1 component of an overall inter-electrode electromotive force obtained by combining the inter-electrode electromotive force originating from a temporal change in magnetic field and the inter-electrode electromotive force originating from the flow velocity of the fluid to be measured. In this case, the inter-electrode electromotive force E61 is expressed by the following equation similar to equation (20):

$$E61 = rk \cdot \omega 1 \cdot b7 \cdot \exp\{j \cdot (\pi/2 + \theta 7 + \theta 00)\} + rkv \cdot b7 \cdot \exp\{j \cdot (\theta 7 + \theta 01)\} \tag{50}$$

Letting E62 be an electromotive force of the angular frequency ω2 component of the overall inter-electrode electromotive force obtained by combining the inter-electrode electromotive force originating from a temporal change in magnetic field and the inter-electrode electromotive force originating from the flow velocity of the fluid to be measured. In this case, the inter-electrode electromotive force E62 is expressed by the following equation similar to equation (20):

$$E62 = rk \cdot \omega 2 \cdot b8 \cdot \exp\{j \cdot (-\pi/2 + \theta 8 + \theta 00)\} + rkv \cdot b8 \cdot \exp\{j \cdot (\theta 8 + \theta 01)\} \tag{51}$$

Assume that ω1=ω0−Δω and ω2=ω0+Δω, θ8=θ7+Δθ8 represents the relationship between a phase lag θ7 of the magnetic field B7 with respect to ω1·t and a phase lag θ8 of the magnetic field B8 with respect to ω2·t, and θ01=θ00+Δθ01 represents the relationship between an angle θ00 of a vector Va with respect to the imaginary axis and an angle θ01 of a vector Vb with respect to the real axis. In this case, the inter-electrode electromotive force E61 obtained when $\theta 01=\theta 00+\Delta\theta 01$, $\omega 1=\omega 0-\Delta\omega$, and equation (18) are substituted into equation (50) is given by $$\begin{aligned} E61 &= rk \cdot (\omega 0 - \Delta\omega) \cdot b7 \cdot \exp\{j \cdot (\pi/2 + \theta 7 + \theta 00)\} + \\ &\quad \gamma \cdot rk \cdot V \cdot b7 \cdot \exp\{j \cdot (\theta 7 + \theta 00 + \Delta\theta 01)\} \\ &= rk \cdot \exp\{j \cdot (\theta 7 + \theta 00)\} \cdot b7 \cdot \{(\omega 0 - \Delta\omega) \cdot \exp(j \cdot \pi/2) + \\ &\quad \gamma \cdot V \cdot \exp(j \cdot \Delta\theta 01)\} \end{aligned} \quad (52)$$

When $\theta 08=\theta 7+\Delta\theta 8$, $\theta 01=\theta 00+\Delta\theta 01$, $\omega 2=\omega 0+\Delta\omega$, and equation (18) are substituted into equation (51) is given by $$\begin{aligned} E62 &= rk \cdot (\omega 0 + \Delta\omega) \cdot b8 \cdot \\ &\quad \exp\{j \cdot (-\pi/2 + \theta 7 + \Delta\theta 8 + \theta 00) + \\ &\quad \gamma \cdot rk \cdot V \cdot b8 \cdot \exp\{j \cdot (\theta 7 + \Delta\theta 8 + \theta 00 + \Delta\theta 01)\} \\ &= rk \cdot \exp\{j \cdot (\theta 7 + \theta 00)\} \cdot b8 \cdot \exp(j \cdot \Delta\theta 8) \cdot \\ &\quad [(\omega 0 + \Delta\omega) \cdot \exp\{j \cdot (-\pi/2)\} + \\ &\quad \gamma \cdot V \cdot \exp(j \cdot \Delta\theta 01)] \end{aligned} \quad (53)$$

According to equations (52) and (53), a sum Es6 of the inter-electrode electromotive forces E61 and E62 and a difference Ed6 between them are given by $$\begin{aligned} Es6 &= E61 + E62 \\ &= rk \cdot \exp\{j \cdot (\theta 7 + \theta 00)\} \cdot b7 \cdot \\ &\quad \{(\omega 0 - \Delta\omega) \cdot \exp(j \cdot \pi/2) + \gamma \cdot V \cdot \exp(j \cdot \Delta\theta 01)\} + \\ &\quad rk \cdot \exp\{j \cdot (\theta 7 + \theta 00)\} \cdot b8 \cdot \exp(j \cdot \Delta\theta 8) \cdot \\ &\quad [(\omega 0 + \Delta\omega) \cdot \exp\{j \cdot (-\pi/2)\} + \\ &\quad \gamma \cdot V \cdot \exp(j \cdot \Delta\theta 01)] \\ &= rk \cdot \exp\{j \cdot (\theta 7 + \theta 00)\} \cdot \\ &\quad [\omega 0 \cdot \exp(j \cdot \pi/2) \cdot \{b7 - b8 \cdot \exp(j \cdot \Delta\theta 8)\} - \\ &\quad \Delta\omega \cdot \exp(j \cdot \pi/2) \cdot \{b7 + b8 \cdot \exp(j \cdot \Delta\theta 8)\} + \\ &\quad \gamma \cdot V \cdot \exp(j \cdot \Delta\theta 01) \cdot \{b7 + b8 \cdot \exp(j \cdot \Delta\theta 8)\}] \end{aligned} \quad (54)$$

$$\begin{aligned} Ed6 &= E61 - E62 \\ &= rk \cdot \exp\{j \cdot (\theta 7 + \theta 00)\} \cdot b7 \cdot \\ &\quad \{(\omega 0 - \Delta\omega) \cdot \exp(j \cdot \pi/2) + \gamma \cdot V \cdot \exp(j \cdot \Delta\theta 01)\} - \\ &\quad rk \cdot \exp\{j \cdot (\theta 7 + \theta 00)\} \cdot b8 \cdot \exp(j \cdot \Delta\theta 8) \cdot \\ &\quad [(\omega 0 + \Delta\omega) \cdot \exp\{j \cdot (-\pi/2)\} + \\ &\quad \gamma \cdot V \cdot \exp(j \cdot \Delta\theta 01)] \\ &= rk \cdot \exp\{j \cdot (\theta 7 + \theta 00)\} \cdot \\ &\quad [\omega 0 \cdot \exp(j \cdot \pi/2) \cdot \{b7 + b8 \cdot \exp(j \cdot \Delta\theta 8)\} - \\ &\quad \Delta\omega \cdot \exp(j \cdot \pi/2) \cdot \{b7 - b8 \cdot \exp(j \cdot \Delta\theta 8)\} + \\ &\quad \gamma \cdot V \cdot \exp(j \cdot \Delta\theta 01) \cdot \{b7 - b8 \cdot \exp(j \cdot \Delta\theta 8)\}] \end{aligned} \quad (55)$$

If the magnetic field B7 generated from a first exciting coil 3a is set to be equal to the magnetic field B8 generated from a second exciting coil 3b in the initial state (at the time of calibration), the difference between the magnetic fields B7 and B8 decreases afterward. As a consequence, the following expression holds:

$$|b7+b8 \cdot \exp(j \cdot \Delta\theta 8)| >> |b7-b8 \cdot \exp(j \cdot \Delta\theta 8)| \quad (56)$$

In expression (56), $|b7+b8 \cdot \exp(j \cdot \Delta\theta 8)|$ represents the magnitude of a complex vector $b7+b8 \cdot \exp(j \cdot \Delta\theta 8)$, and $|b7-b8 \cdot \exp(j \cdot \Delta\theta 8)|$ represents the magnitude of a complex vector $b7-b8 \cdot \exp(j \cdot \Delta\theta 8)$.

In addition, since $\omega 0 > \gamma \cdot V$, and $\omega 0 > \Delta\omega$ generally hold, the following condition holds in equation (55) in consideration of the condition represented by expression (56).

$$|\omega 0 \cdot \exp(j \cdot \pi/2) \cdot \{b7+b8 \cdot \exp(j \cdot \Delta\theta 8)\}| >> |-\Delta\omega \cdot \exp(j \cdot \pi/2) \cdot \{b7-b8 \cdot \exp(j \cdot \Delta\theta 8)\} + \gamma \cdot V \cdot \exp(j \cdot \Delta\theta 01) \cdot \{b7-b8 \cdot \exp(j \cdot \Delta\theta 8)\}| \quad (57)$$

In expression (57), $|\omega 0 \cdot \exp(j \cdot p/2) \cdot \{b7+b8 \cdot \exp(j \cdot \Delta\theta 8)\}|$ represents the magnitude of a complex vector $\omega j 0 \cdot \exp(j \cdot p/2) \cdot \{b7+b8 \cdot \exp(j \cdot \Delta\theta 8)\}$, and $|-\Delta\omega \cdot \exp(j \cdot \pi/2) \cdot \{b7-b8 \cdot \exp(j \cdot \Delta\theta 8)\} + \gamma \cdot V \cdot \exp(j \cdot \Delta\theta 01) \cdot \{b7-b8 \cdot \exp(j \cdot \Delta\theta 8)\}|$ represents the magnitude of a complex vector $-\Delta\omega \cdot \exp(j \cdot \pi/2) \cdot \{b7-b8 \cdot \exp(j \cdot \Delta\theta 8)\} + \gamma \cdot V \cdot \exp(j \cdot \Delta\theta 01) \cdot \{b7-b8 \cdot \exp(j \cdot \Delta\theta 8)\}$.

The following expressions represent an inter-electrode electromotive force EdA6 which approximates the electromotive force difference Ed6 by using the condition of expression (57).

$$EdA6 \approx Ed6 \quad (58)$$

$$EdA6 = rk \cdot \exp\{j \cdot (\theta 7+\theta 00)\} \cdot \omega 0 \cdot \exp(j \cdot \pi/2) \cdot \{b7+b8 \cdot \exp(j \cdot \Delta\theta 8)\} \quad (59)$$

Figure 9:
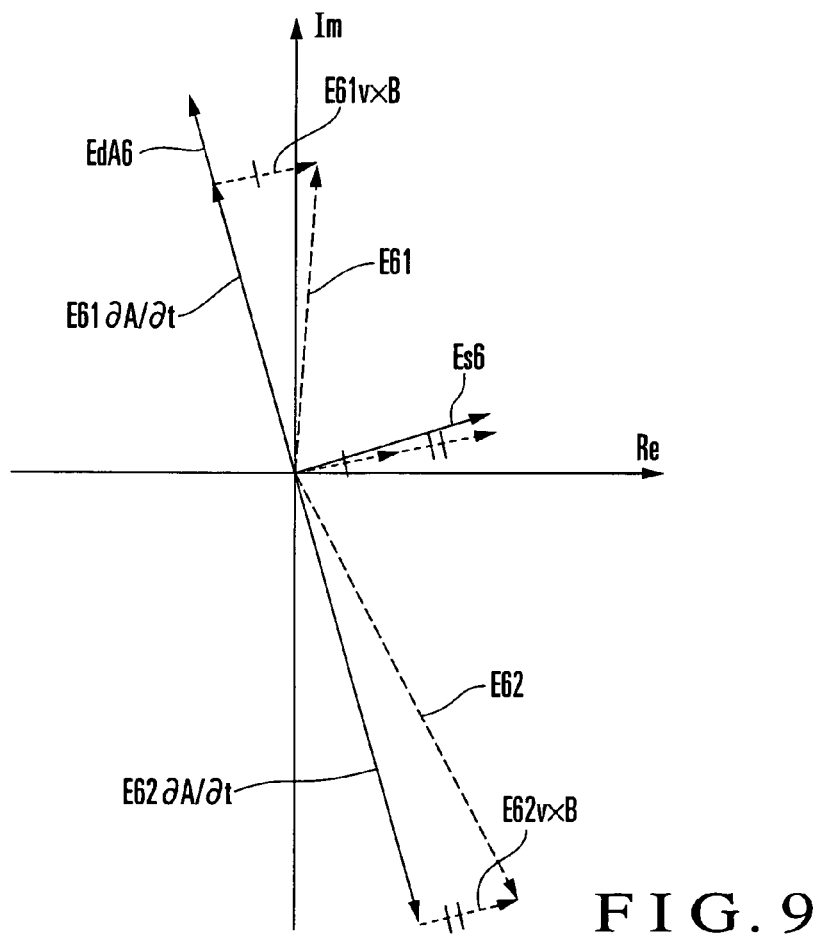
FIG. 9 is a view expressing inter-electrode electromotive forces, electromotive force sum, and an electromotive force difference in the form of complex vectors in the second embodiment of the present invention.

The inter-electrode electromotive force EdA6 is irrelevant to the magnitude V of the flow velocity, and hence is only the component generated by $\partial A/\partial t$. The inter-electrode electromotive force EdA6 is used to normalize a coefficient (span) by which the magnitude V of the flow velocity of the v×B component in the electromotive force sum Es6 (resultant vector Va+Vb) is multiplied. FIG. 9 is a view expressing the inter-electrode electromotive forces E61, E62, and EdA6, and the electromotive force difference Ed6 described above in the form of complex vectors. Referring to FIG. 9, reference symbol E61v×B denotes a v×B component $rk \cdot \exp\{j \cdot (\theta 7+\theta 00)\} \cdot b7 \cdot \gamma \cdot V \cdot \exp(j \cdot \Delta\theta 01)$ of the inter-electrode electromotive force E61; E62v×B, a v×B component $rk \cdot \exp\{j \cdot (\theta 7+\theta 00)\} \cdot \gamma \cdot V \cdot \exp(j \cdot \Delta\theta 01) \cdot b8 \cdot \exp(j \cdot \Delta\theta 8)\}$ of the inter-electrode electromotive force E62; E61$\partial A/\partial t$, a $\partial A/\partial t$ component $rk \cdot \exp\{j \cdot (\theta 7+\theta 00)\} \cdot (\omega 0-\Delta\omega) \cdot \exp(j \cdot p/2) \cdot b7$ of the inter-electrode electromotive force E61; and E62$\partial A/\partial t$, a $\partial A/\partial t$ component $rk \cdot \exp\{j \cdot (\theta 7+\theta 00)\} \cdot (\omega 0+\Delta\omega) \cdot \exp\{j \cdot (-p/2)\} \cdot b8 \cdot \exp(j \cdot \Delta\theta 8)$ of the inter-electrode electromotive force E62.

Letting En6 be the result obtained by normalizing the electromotive force sum Es6 given by equation (54) with the inter-electrode electromotive force EdA6 given by equation (59) and multiplying the electromotive force sum by $\omega 0$, the normalized electromotive force En6 is given by equation (60):

$$\begin{aligned} En6 &= (Es6/EdA6) \cdot \omega 0 \\ &= rk \cdot \exp\{j \cdot (\theta 7 + \theta 00)\} \cdot \\ &\quad [\omega 0 \cdot \exp(j \cdot \pi/2) \cdot \{b7 - b8 \cdot \exp(j \cdot \Delta\theta 8)\} - \\ &\quad \Delta\omega \cdot \exp(j \cdot \pi/2) \cdot \{b7 + b8 \cdot \exp(j \cdot \Delta\theta 8)\} + \end{aligned} \quad (60)$$

-continued $$\gamma \cdot V \cdot \exp(j \cdot \Delta\theta 01) \cdot \{b7 + b8 \cdot \exp(j \cdot \Delta\theta 8)\}/$$

$$[rk \cdot \exp\{j \cdot (\theta 7 + \theta 00)\} \cdot$$

$$\omega 0 \cdot \exp(j \cdot \pi/2) \cdot \{b7 + b8 \cdot \exp(j \cdot \Delta\theta 8)\}] \cdot \omega 0$$

$$= \omega 0 \cdot \{b7 - b8 \cdot \exp(j \cdot \Delta\theta 8)\}/$$

$$\{b7 + b8 \cdot \exp(j \cdot \Delta\theta 8)\} - \Delta\omega +$$

$$[\gamma \cdot \exp\{(j \cdot (-\pi/2 + \Delta\theta 01)\}] \cdot V$$

Figure 10:
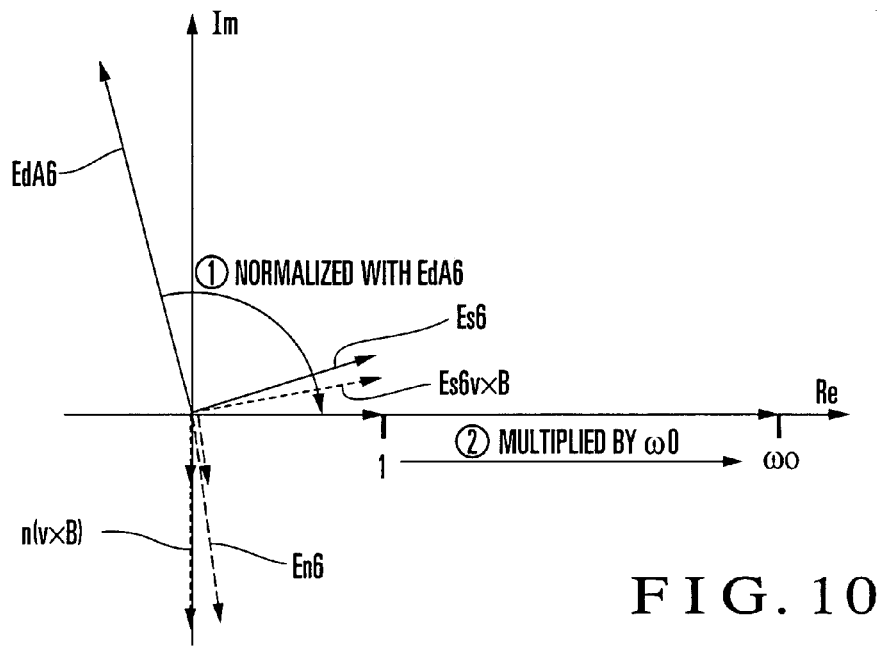
FIG. 10 is a view expressing the manner of normalization processing in the form of complex vectors in the second embodiment of the present invention.

The third term of the right side of equation (60) is the term obtained by normalizing the component generated by v×B with the component generated by ∂A/∂t. FIG. 10 is a view expressing the manner of the above normalization processing in the form of complex vectors. Referring to FIG. 10, reference symbol Es6v×B denotes a v×B component of the electromotive force sum Es6; and n(v×B), a normalized v×B component $[\gamma \cdot \exp\{j \cdot (-p/2+\Delta\theta 01)\}] \cdot V$. The reason why the result obtained by normalizing the electromotive force sum Es6 with the inter-electrode electromotive force EdA6 is multiplied by ω0 is to erase the exciting angular frequency ω0 from the third term of the right side associated with the magnitude V of the flow velocity. According to equation (60), the complex coefficient by which the magnitude V of the flow velocity is multiplied has the magnitude of γ and the angle of −p/2+Δθ01 with respect to the real axis. The coefficient γ and the angle Δθ01 are constants which can be obtained in advance by calibration and the like, and the third term of the right side of equation (60) remains constant unless the flow velocity of the fluid to be measured changes.

Normalizing the v×B component by using the ∂A/∂t component makes it possible to implement span correction of automatically correcting an error due to a magnetic field shift or phase change. Assume that the distance d1 from the plane PLN which is orthogonal to the measuring tube axis PAX and includes the electrodes 2a and 2b to the first exciting coil 3a is almost equal to the distance d2 from the plane PLN to the second exciting coil 3b. In this case (b1≈b2), if b7≈b8 and Δθ8≈0, the magnitude V of the flow velocity is expressed as follows according to equation (60):

$$V = |(En6 + \Delta\omega)/[\gamma \cdot \exp\{j \cdot (-\pi/2 + \Delta\theta 01)\}]| \qquad (61)$$
$$= |En6 + \Delta\omega|/\gamma$$

Table 2 shows the correspondence relationship between the constants and variables used in the basic principle described above and the constants and variables in this embodiment. As is obvious from Table 2, this embodiment is an example of specifically implementing the basic principle described above.

TABLE 2

Correspondence Relationship between Basic
Principle and Second Embodiment

| Constants and Variables in Basic Principle | Constants and Variables in Second Embodiment |
|---|---|
| rω | 1 |
| rv | γ |
| θω | π/2 |
| θv | Δθ01 |
| C | $rk \cdot \exp\{j(\theta 7 + \theta 00)\} \cdot \{b7 + b8 \cdot \exp(j \cdot \Delta\theta 8)\}$ |

Figure 11:
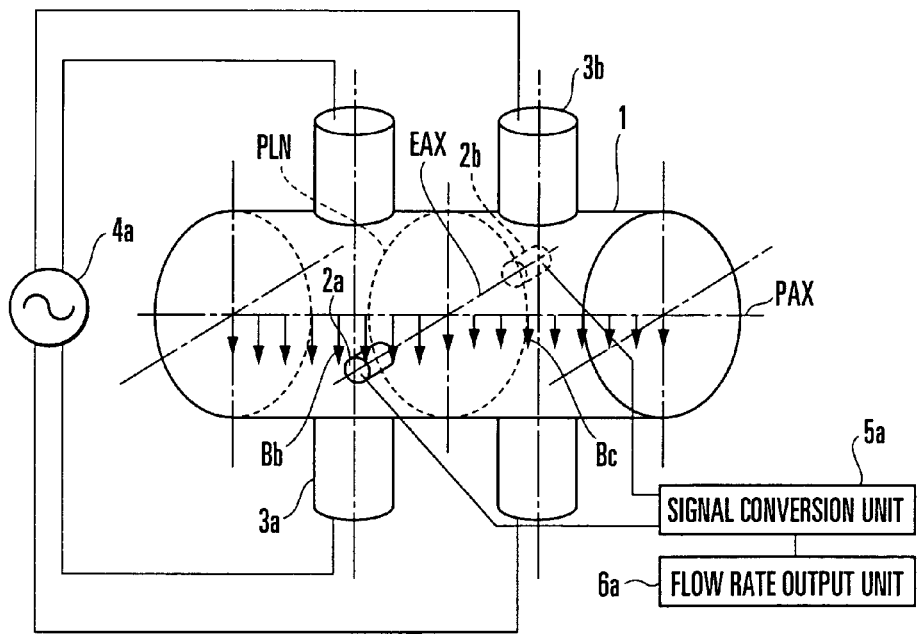
FIG. 11 is a block diagram showing the arrangement of an electromagnetic flowmeter according to the second embodiment of the present invention.

A specific arrangement of the electromagnetic flowmeter of this embodiment and its operation will be described next. FIG. 11 is a block diagram showing the arrangement of the electromagnetic flowmeter according to this embodiment. The same reference numerals as in FIG. 6 denote the same components in FIG. 11. The electromagnetic flowmeter according to this embodiment includes the measuring tube 1, the electrodes 2a and 2b, the first and second exciting coils 3a and 3b, a power supply unit 4a which supplies exciting currents to the first and second exciting coils 3a and 3b, a signal conversion unit 5a which obtains the amplitudes and phases of the two frequency components of the first and second frequencies of the resultant electromotive force detected by the electrodes 2a and 2b, and extracts the electromotive force difference between these two frequency components as the ∂A/∂t component on the basis of the amplitudes and phases of the resultant electromotive forces, and a flow rate output unit 6a which removes a variation factor for a span contained in the v×B component in the electromotive force sum of the two frequency components of the resultant electromotive force detected by the electrodes 2a and 2b, and calculates the flow rate of the fluid to be measured from the result obtained by removing the variation factor. The first and second exciting coils 3a and 3b and the power supply unit 4a constitute an exciting unit which applies a time-changing magnetic field asymmetric to the plane PLN to the fluid to be measured.

Assume that in this embodiment, as described above, the distance d1 from the plane PLN to the first exciting coil 3a is almost equal to the distance d2 from the plane PLN to the second exciting coil 3b.

The power supply unit 4a supplies the first sine wave exciting current with the first angular frequency ω1=ω0−Δω to the exciting coil 3a, and, at the same time, the second sine wave exciting current with the second angular frequency ω2=ω0+Δω to the second exciting coil 3b. In this case, the amplitudes of the first and second sine wave exciting currents are the same.

Figure 12:
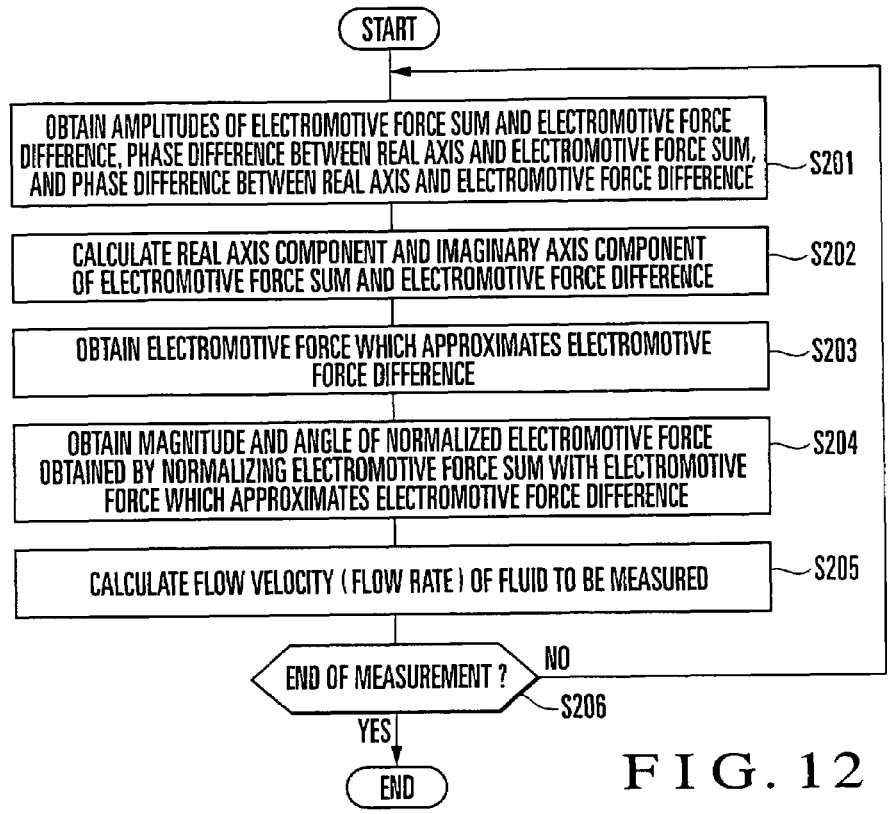
FIG. 12 is a flowchart showing the operations of a signal conversion unit and flow rate output unit in the second embodiment of the present invention.

FIG. 12 is a flowchart showing the operations of the signal conversion unit 5a and flow rate output unit 6a. First of all, the signal conversion unit 5a causes a phase detector (not shown) to obtain an amplitude rs6 of the electromotive force sum Es6 between the inter-electrode electromotive forces E61 and E62, and a phase difference φs6 between the real axis and the electromotive force sum Es6. Additionally, the signal conversion unit 5a causes the phase detector (not shown) to obtain an amplitude rd6 of the electromotive force difference Ed6 between the inter-electrode electromotive forces E61 and E62, and a phase difference fs6 between the real axis and the electromotive force difference Ed6 (step S201 in FIG. 12). The inter-electrode electromotive forces E61 and E62 can separate the frequency by using bandpass filter and comb filter.

The signal conversion unit 5a then calculates a real axis component Es6x and imaginary axis component Es6y of the electromotive force sum Es6, and a real axis component Ed6x and imaginary axis component Ed6y of the electromotive force difference Ed6 according to the following equations (step S202):

$$Es6x = rs6 \cdot \cos(\phi s6) \qquad (62)$$

$$Es6y = rs6 \cdot \sin(\phi s6) \qquad (63)$$

$$Ed6x = rd6 \cdot \cos(\phi d6) \qquad (64)$$

$$Ed6y = rd6 \cdot \sin(\phi d6) \qquad (65)$$

After the calculation of equations (62) to (65), the signal conversion unit 5a obtains the magnitude and angle of the electromotive force EdA6 which approximates the electromotive force difference Ed6 (step S203). The processing in step S203 corresponds to the processing of obtaining a ∂A/∂t component and a v×B component, and is equivalent to the calculation of equation (59). The signal conversion unit 5a calculates a magnitude |EdA6| of the electromotive force difference EdA which approximates the electromotive force difference Ed6 according to the following equation:

$$|EdA6|=(Ed6x^2+Ed6y^2)^{1/2} \quad (66)$$

The signal conversion unit 5a then calculates an angle ∠EdA6 of the inter-electrode electromotive force EdA6 with respect to the real axis according to the following equation:

$$\angle EdA6=\tan^{-1}\{(Ed6y/Ed6x) \quad (67)$$

With the above operation, the processing in step S203 is complete.

The flow rate output unit 6a then obtains the magnitude and angle of the normalized electromotive force En6 obtained by normalizing the electromotive force sum Es6 with the inter-electrode electromotive force EdA6 (step S204). The processing in step S204 is equivalent to the calculation of equation (60). The flow rate output unit 6a calculates a magnitude |En6| of the normalized electromotive force En6 according to the following equation:

$$|En6|=(rs6/|EdA6|)\cdot\omega 0 \quad (68)$$

The flow rate output unit 6a also calculates an angle ∠En6 of the normalized electromotive force En6 with respect to the real axis according to the following equation:

$$\angle En6=\phi s6- \angle EdA6 \quad (69)$$

With this operation, the processing in step S204 is complete.

The flow rate output unit 6a then calculates the magnitude V of the flow velocity of the fluid to be measured (step S205). The processing in step S205 corresponds to the calculation of equation (61). The flow rate output unit 6a calculates a real axis component En6x of (En6+Δω) and an imaginary axis component En6y of (En6+Δω) according to the following equations:

$$En6x=|En6|\cos(\angle En6)+\Delta\omega \quad (70)$$

$$En6y=|En6|\sin(\angle En6) \quad (71)$$

The flow rate output unit 6a then calculates the magnitude V of the flow velocity of the fluid to be measured according to the following equation:

$$V=(En6x^2+En6y^2)^{1/2}/\gamma \quad (72)$$

With this operation, the processing in step S205 is complete. The signal conversion unit 5a and the flow rate output unit 6a perform the processing in steps S201 to S205 described above every predetermined cycle until, for example, the end of the measurement is designated by the operator (YES in step S206).

As described above, this embodiment pays attention to the fact that when the magnetic fields having the same magnitude and different frequencies are applied from the exciting coils 3a and 3b to the fluid to be measured, the electromotive force difference Ed6 between the electromotive force E61 of the angular frequency w1 component and the electromotive force E62 of the angular frequency ω2 component of the electromotive force between the electrodes 2a and 2b can be executed as the ∂A/∂t component. Accordingly, this embodiment is configured to normalize a span by which the magnitude V of the flow velocity of the v×B component in the electromotive force sum Es6 (resultant vector Va+Vb) by using the ∂A/∂t component, thereby erasing the span variation element. Therefore, the embodiment can automatically perform accurate span correction and can execute accurate flow rate measurement.

Note that this embodiment has exemplified the case of extracting the electromotive force difference Ed6 between the inter-electrode electromotive forces E61 and E62, and normalizing the electromotive force sum Es6 by using the extracted electromotive force difference Ed6. However, the present invention is not limited to this. The electromotive force sum Es6 can be approximately extracted as the ∂A/∂t component, and the electromotive force difference Ed6 can be normalized by using this ∂A/∂t component.

Third Embodiment

The third embodiment of the present invention will be described next. This embodiment is the same as the first embodiment except that one pair of electrodes are added to the electromagnetic flowmeter, and uses the second extraction method as a method of extracting a vector Va of a ∂A/∂t component and the second correction method as a span correction method. That is, the electromagnetic flowmeter of this embodiment includes one exciting coil and two pairs of electrodes. If the second electrodes to be newly added are placed on the same side as the existing first electrodes, the resultant arrangement is a redundant arrangement of the first embodiment. Therefore, the second electrodes need to be placed on a side different from that of the first electrodes through the exciting coil.

Figure 13:
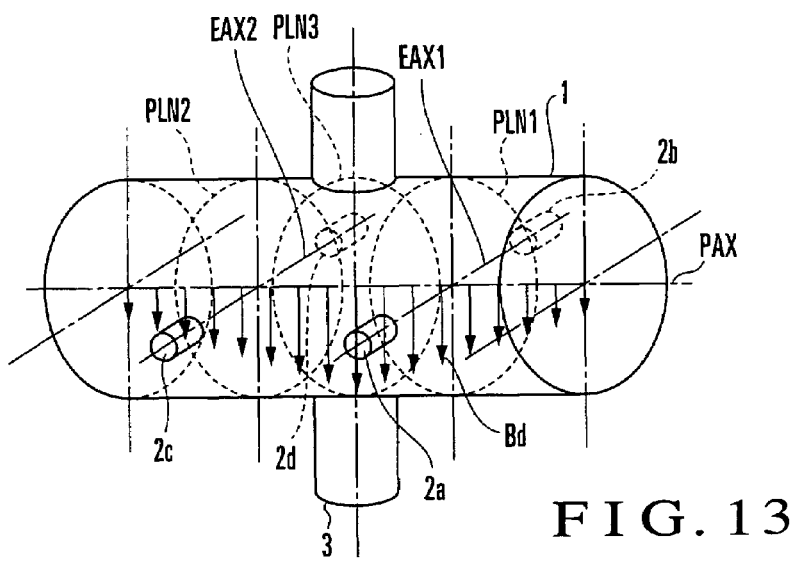
FIG. 13 is a block diagram for explaining the principle of an electromagnetic flowmeter according to the third embodiment of the present invention.

FIG. 13 is a block diagram for explaining the principle of the electromagnetic flowmeter according to this embodiment. This electromagnetic flowmeter includes a measuring tube 1, first electrodes 2a and 2b and second electrodes 2c and 2d which are arranged in the measuring tube 1 to be perpendicular to both a magnetic field applied to a fluid to be measured and a measuring tube axis PAX and face each other so as to be come into contact with the fluid to be measured, and detect the electromotive force generated by the magnetic field and the flow of the fluid to be measured, and an exciting coil 3 which applies, to the fluid to be measured, a time-changing magnetic field which is asymmetric on the front and rear sides of the measuring tube 1 which are bordered on a plane PLN1 and a time-changing magnetic field which is asymmetric on the front and rear sides of the measuring tube 1 which are bordered on a plane PLN2, with a plane which is perpendicular to the measuring tube axis PAX and includes the first electrodes 2a and 2b serving as the plane PLN1 and a plane which is perpendicular to the measuring tube axis PAX and includes the second electrodes 2c and 2d serving as the plane PLN2.

The first electrodes 2a and 2b are placed at a position spaced apart from a plane PLN3 which includes the axis of the exciting coil 3 and is perpendicular to the direction of the measuring tube axis PAX by an offset distance d3 to, for example, the upstream side. The second electrodes 2c and 2d are placed at a position spaced apart from the plane PLN3 by an offset distance d4 to, for example, the downstream side so as to face the first electrodes 2a and 2b through a plane PLN.

Assume that a magnetic field component (magnetic flux density) B9, of a magnetic field Bb generated from the exciting coil 3, which is orthogonal to both an electrode axis EAX1 connecting the electrodes 2a and 2b and the measuring tube axis PAX on the electrode axis EAX1, and a magnetic field component (magnetic flux density) B10, of the magnetic field Bd generated from the exciting coil 3, which is orthogonal to both an electrode axis EAX2 connecting the electrodes 2c and 2d and the measuring tube axis PAX on the electrode axis EAX2 are given by $$B9 = b9 \cdot \cos(\omega 0 \cdot t - \theta 9) \tag{73}$$

$$B10 = b10 \cdot \cos(\omega 0 \cdot t - \theta 10) \tag{74}$$

Note, however, that since the magnetic fields B9 and B10 are generated from one exciting coil 3, b9 and b10 and θ9 and θ10 are associated with each other and are not independent variables. In equations (73) and (74), reference symbols b9 and b10 denote the amplitudes of the magnetic flux densities B9 and B10; ω0, an angular frequency; and θ9 and θ10, the phase differences (phase delays) between the magnetic flux densities B9 and B10 and ω0·t. The magnetic flux densities B9 and B10 will be respectively referred to as the magnetic fields B9 and B10 hereinafter.

Figure 14:
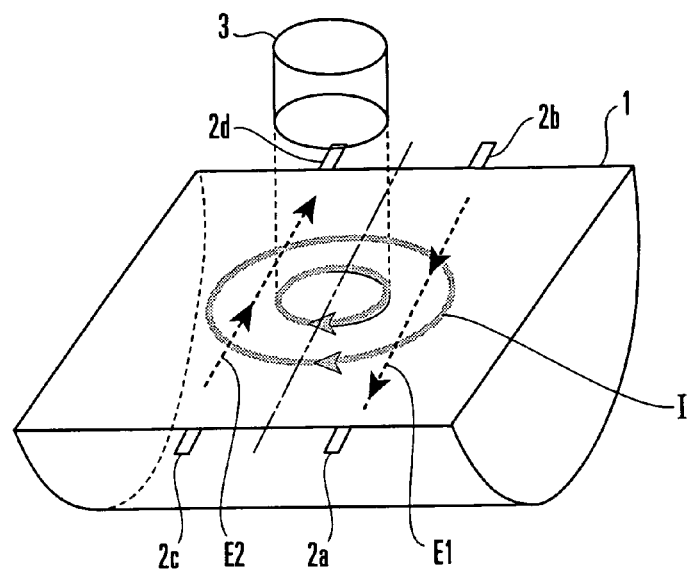
FIG. 14 is a showing eddy currents and inter-electrode electromotive forces when the flow rate of a fluid to be measured is 0 in the third embodiment of the present invention.

If the flow velocity of the fluid to be measured is 0, a generated eddy current is only a component originating from a change in magnetic field. An eddy current I due to a change in the magnetic field Bd is directed as shown in FIG. 14. Therefore, an electromotive force E1 which is generated between the electrodes 2a and 2b by a change in the magnetic field Bd and is irrelevant to the flow velocity and an electromotive force E2 which is generated between the electrodes 2c and 2d by a change in the magnetic field Bd and is irrelevant to the flow velocity are directed opposite to each other within a plane including the electrode axis EAX1 and the measuring tube axis PAX, as shown in FIG. 14.

Figure 15:
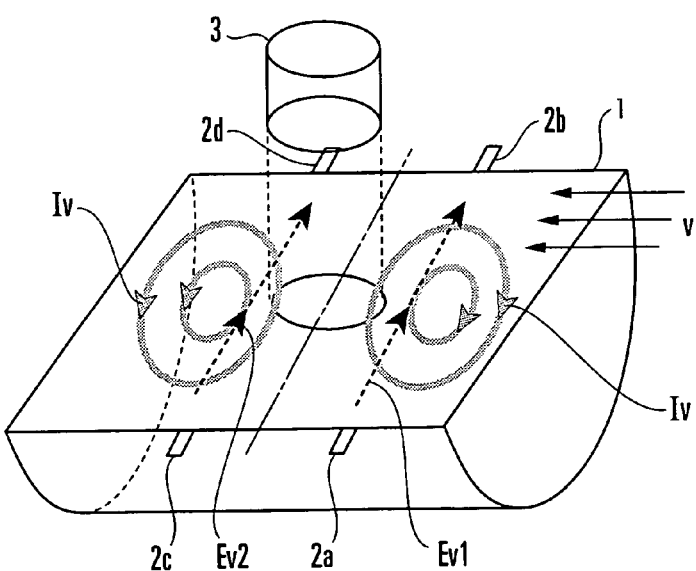
FIG. 15 is a view showing eddy currents and inter-electrode electromotive forces when the flow rate of a fluid to be measured is 0 in the third embodiment of the present invention.

If the flow velocity of the fluid to be measured is V(V≠0), a component v×Bd originating from a flow velocity vector v of the fluid to be measured is generated in the generated eddy current in addition to the eddy current I generated when the flow velocity is 0. For this reason, an eddy current Iv originating from the flow velocity vector v and the magnetic field Bd is directed as shown in FIG. 15. Consequently, an electromotive force Ev1 generated between the electrodes 2a and 2b by the flow velocity vector v and the magnetic field Bd and an electromotive force Ev2 generated between the electrodes 2c and 2d by the flow velocity vector v and the magnetic field Bd are directed in the same direction.

Considering the directions of the inter-electrode electromotive forces described with reference to FIGS. 14 and 15, a first electromotive force E71 between the electrodes 2a and 2b obtained by combining the inter-electrode electromotive force originating from a temporal change in magnetic field and the inter-electrode electromotive force originating from the flow velocity of the fluid to be measured is expressed by the following equation similar to equation (20):

$$E71 = rk \cdot \omega 0 \cdot b9 \cdot \exp\{j \cdot (\pi/2 + \theta 9 + \theta 00)\} + rkv \cdot b9 \cdot \exp\{j \cdot (\theta 9 + \theta 01)\} \tag{75}$$

A second inter-electrode electromotive force E72 between the electrodes 2c and 2d obtained by combining the inter-electrode electromotive force originating from a temporal change in magnetic field and the inter-electrode electromotive force originating from the flow velocity of the fluid to be measured is expressed by the following equation (20):

$$E72 = rk \cdot \omega 0 \cdot b10 \cdot \exp\{j \cdot (-\pi/2 + \theta 10 + \theta 00)\} + rkv \cdot b10 \cdot \exp\{j \cdot (\theta 10 + \theta 00)\} \tag{76}$$

According to equations (75) and (76), a sum Es7 of the first inter-electrode electromotive force E71 and the second inter-electrode electromotive force E72 and a difference Ed7 between them are given by $$\begin{aligned} Es7 &= E71 + E72 \\ &= rk \cdot \omega 0 \cdot b9 \cdot \exp\{j \cdot (\pi/2 + \theta 9 + \theta 00)\} + \\ &\quad rkv \cdot b9 \cdot \exp\{j \cdot (\theta 9 + \theta 01)\} + \\ &\quad rk \cdot \omega 0 \cdot b10 \cdot \exp\{j \cdot (-\pi/2 + \theta 10 + \theta 00)\} + \\ &\quad rkv \cdot b10 \cdot \exp\{j \cdot (\theta 10 + \theta 01)\} \end{aligned} \tag{77}$$

$$\begin{aligned} Ed7 &= E71 + E72 \\ &= rk \cdot \omega 0 \cdot b9 \cdot \exp\{j \cdot (\pi/2 + \theta 9 + \theta 00)\} + \\ &\quad rkv \cdot b9 \cdot \exp\{j \cdot (\theta 9 + \theta 01)\} - \\ &\quad rk \cdot \omega 0 \cdot b10 \cdot \exp\{j \cdot (-\pi/2 + \theta 10 + \theta 00)\} - \\ &\quad rkv \cdot b10 \cdot \exp\{j \cdot (\theta 10 + \theta 01)\} \end{aligned} \tag{78}$$

Assume that θ10=θ9+Δθ10 represents the relationship between a phase lag θ9 of the magnetic field B9 with respect to ω0·t and a phase lag θ10 of the magnetic field B10 with respect to ω0·t, and θ01=θ00+Δθ01 represents the relationship between an angle θ00 of a vector Va with respect to the imaginary axis and an angle θ01 of a vector Vb with respect to the real axis. In this case, when θ10=θ9+Δθ10, θ01=θ00+Δθ01, and equation (18) are substituted into equations (77) and (78), the electromotive force sum Es7 and the electromotive force difference Ed7 are given by $$\begin{aligned} Es7 &= rk \cdot \omega 0 \cdot b9 \cdot \exp\{j \cdot (\pi/2 + \theta 9 + \theta 00)\} + \\ &\quad \gamma \cdot rk \cdot V \cdot b9 \cdot \exp\{j \cdot (\theta 9 + \theta 00 + \Delta\theta 01)\} + \\ &\quad rk \cdot \omega 0 \cdot b10 \cdot \exp\{j \cdot (-\pi/2 + \theta 9 + \Delta\theta 10 + \theta 00)\} + \\ &\quad \gamma \cdot rk \cdot V \cdot b10 \cdot \exp\{j \cdot (\theta 9 + \Delta\theta 10 + \theta 00 + \Delta\theta 01)\} \\ &= rk \cdot \exp\{j \cdot (\theta 9 + \theta 00)\} \cdot \\ &\quad [\omega 0 \cdot \exp(j \cdot \pi/2) \cdot \{b9 - b10 \cdot \exp(j \cdot \Delta\theta 10)\} + \\ &\quad \gamma \cdot V \cdot \exp(j \cdot \Delta\theta 01) \cdot \\ &\quad \{b9 + b10 \cdot \exp(j \cdot \Delta\theta 10)\} \end{aligned} \tag{79}$$

$$\begin{aligned} Ed7 &= rk \cdot \omega 0 \cdot b9 \cdot \exp\{j \cdot (\pi/2 + \theta 9 + \theta 00)\} + \\ &\quad \gamma \cdot rk \cdot V \cdot b9 \cdot \exp\{j \cdot (\theta 9 + \theta 00 + \Delta\theta 01)\} - \\ &\quad rk \cdot \omega 0 \cdot b10 \cdot \exp\{j \cdot (-\pi/2 + \theta 9 + \Delta\theta 10 + \theta 00)\} - \\ &\quad \gamma \cdot rk \cdot V \cdot b10 \cdot \exp\{j \cdot (\theta 9 + \Delta\theta 10 + \theta 00 + \Delta\theta 01)\} \\ &= rk \cdot \exp\{j \cdot (\theta 9 + \theta 00)\} \cdot \\ &\quad [\omega 0 \cdot \exp(j \cdot \pi/2) \cdot \{b9 + b10 \cdot \exp(j \cdot \Delta\theta 10)\} + \\ &\quad \gamma \cdot V \cdot \exp(j \cdot \Delta\theta 01) \cdot \\ &\quad \{b9 - b10 \cdot \exp(j \cdot \Delta\theta 10)\}] \end{aligned} \tag{80}$$

If the distance d3 from the plane PLN3 which includes the axis of the exciting coil 3 to the electrode axis EAX connecting the electrodes 2a and 2b is almost equal to the distance d4 from the plane PLN3 to electrode axis EAX connecting the electrodes 2a and 2b, and the magnetic field B9 is set to be equal to the magnetic field B10 in the initial state (at the time of calibration), the difference between the magnetic fields B9 and B10 decreases afterward. As a consequence, the following expression holds:

$$|b9 + b10 \cdot \exp(j \cdot \Delta\theta 10)| \gg |b9 - b10 \cdot \exp(j \cdot \Delta\theta 10)| \tag{81}$$

In expression (81), $|b9+b10\cdot\exp(j\cdot\Delta\theta 10)|$ represents the magnitude of a complex vector $b9+b10\cdot\exp(j\cdot\Delta\theta 10)$, and $|b9-b10\cdot\exp(j\cdot\Delta\theta 10)|$ represents the magnitude of a complex vector $b9-b10\cdot\exp(j\cdot\Delta\theta 10)$.

In addition, since $\omega 0 > \gamma\cdot V$ generally holds, the following condition holds in equation (80) in consideration of the condition represented by expression (81).

$$|\omega 0\cdot\exp(j\cdot\pi/2)\cdot\{b9+b10\cdot\exp(j\cdot\Delta\theta 10)\}| >> |\gamma\cdot V\cdot\exp(j\cdot\Delta\theta 01)\cdot\{b9-b10\cdot\exp(j\cdot\Delta\theta 10)\}| \quad (82)$$

In expression (82), $|\omega 0\cdot\exp(j\cdot p/2)\cdot\{b9+b10\cdot\exp(j\cdot\Delta\theta 10)\}|$ represents the magnitude of a complex vector $\omega 0\cdot\exp(j\cdot p/2)\cdot\{b9+b10\ \exp(j\cdot\Delta\theta 10)\}$, and $|\gamma\cdot V\cdot\exp(j\cdot\Delta\theta 01)\cdot\{b9-b10\cdot\exp(j\cdot\Delta\theta 10)\}|$ represents the magnitude of a complex vector $\gamma\cdot V\cdot\exp(j\cdot\Delta\theta 01)\cdot\{b9-b10\cdot\exp(j\cdot\Delta\theta 10)\}$.

The following expressions represent an inter-electrode electromotive force EdA7 which approximates the electromotive force difference Ed7 by using the condition of expression (82).

$$EdA7 \approx Ed7 \quad (83)$$

$$EdA7 = rk\cdot\exp\{j\cdot(\theta 9+\theta 00)\}\cdot\omega 0\cdot\exp(j\cdot\pi/2)\cdot\{b9+b10\cdot\exp(j\cdot\Delta\theta 10)\} \quad (84)$$

Figure 16:
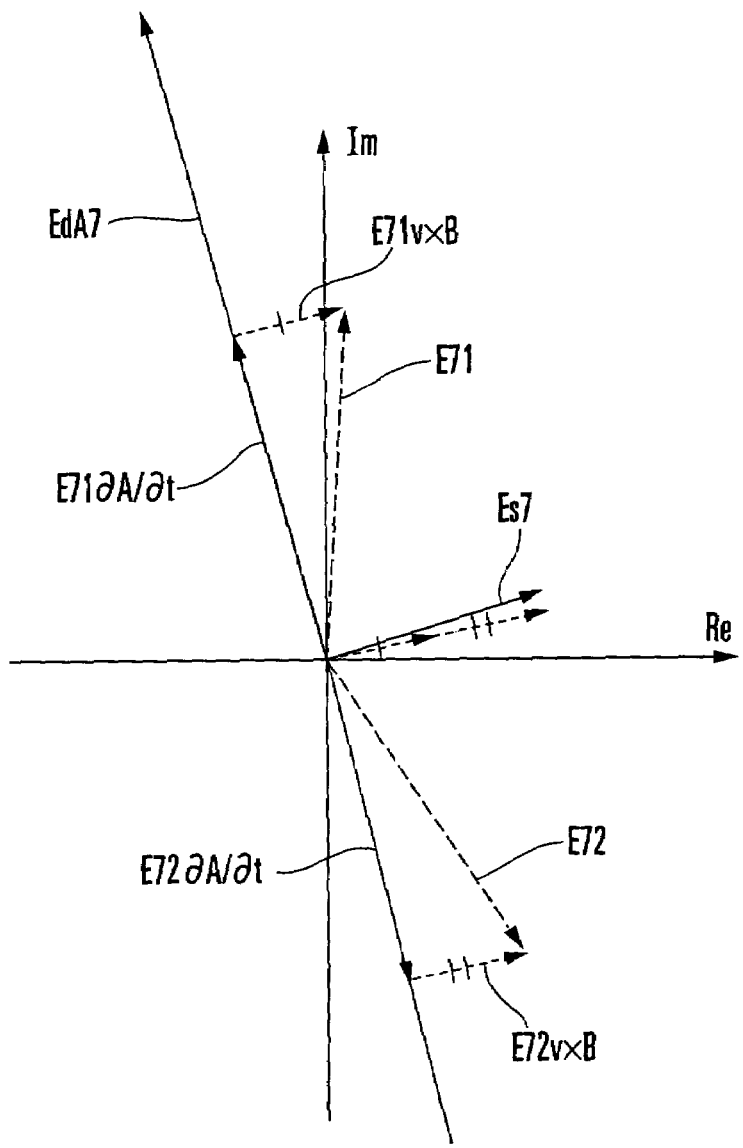
FIG. 16 is a view expressing inter-electrode electromotive forces, electromotive force sums, and electromotive force differences in the form of complex vectors in the third embodiment of the present invention.

According to equation (84), the component generated by $\partial A/\partial t$ can be extracted without binarizing the exciting frequency. The inter-electrode electromotive force EdA7 is irrelevant to the magnitude V of the flow velocity, and hence is only the component generated by $\partial A/\partial t$. The inter-electrode electromotive force EdA7 is used to normalize a coefficient (span) by which the magnitude V of the flow velocity of the v×B component in the electromotive force sum Es7 (resultant vector Va+Vb). FIG. 16 is a view expressing the inter-electrode electromotive forces E71, E72, and EdA7, electromotive force sum Es7, and electromotive force difference Ed7 in the form of complex vectors. Referring to FIG. 16, reference symbol E71v×B denotes a v×B component $rk\cdot\exp\{j\cdot(\theta 9+\theta 00)\}\cdot b9\cdot\gamma\cdot V\cdot\exp(j\cdot\Delta\theta 01)$ of the inter-electrode electromotive force E71; E72v×B, a v×B component $rk\cdot\exp\{j\cdot(\theta 9+\theta 00)\}\cdot\gamma\cdot V\cdot\exp(j\cdot\Delta\theta 01)\cdot b10\cdot\exp(j\cdot\Delta\theta 10)\}$ of the inter-electrode electromotive force E72; E71$\partial$A/$\partial$t, a $\partial$A/$\partial$t component $rk\cdot\exp\{j\cdot(\theta 9+\theta 00)\}\cdot\omega 0\cdot\exp(j\cdot p/2)\cdot b9$ of the inter-electrode electromotive force E71; and E72$\partial$A/$\partial$t, a $\partial$A/$\partial$t component $rk\cdot\exp\{j\cdot(\theta 9+\theta 00)\}\cdot\omega 0\cdot\exp\{j\cdot(-p/2)\}\cdot b10\cdot\exp(j\cdot\Delta\theta 10)$ of the inter-electrode electromotive force E72.

Letting En7 be the result obtained by normalizing the electromotive force sum Es7 given by equation (79) with the inter-electrode electromotive force EdA7 given by equation (84) and multiplying the normalization result by $\omega 0$, the normalized electromotive force En7 is given by equation (85):

$$En7 = (Es7/EdA7)\cdot\omega 0 \quad (85)$$

$$= rk\cdot\exp\{j\cdot(\theta 9+\theta 00)\}\cdot$$

$$[\omega 0\cdot\exp(j\cdot\pi/2)\cdot\{b9-b10\cdot\exp(j\cdot\Delta\theta 10)\}+$$

$$\gamma\cdot V\cdot\exp(j\cdot\Delta\theta 01)\cdot\{b9+b10\cdot\exp(j\cdot\Delta\theta 10)\}]/[rk\cdot$$

$$\exp\{j\cdot(\theta 9+\theta 00)\}\cdot\omega 0\cdot\exp(j\cdot\pi/2)\cdot$$

$$\{b9+b10\cdot\exp(j\cdot\Delta\theta 10)\}]\cdot\omega 0$$

$$= \omega 0\cdot\{b9-b10\cdot\exp(j\cdot\Delta\theta 10)\}/\{b9+b10\cdot$$

$$\exp(j\cdot\Delta\theta 10)\}+[\gamma\cdot\exp\{j\cdot(-\pi/2+\Delta\theta 01)\}]\cdot V$$

Figure 17:
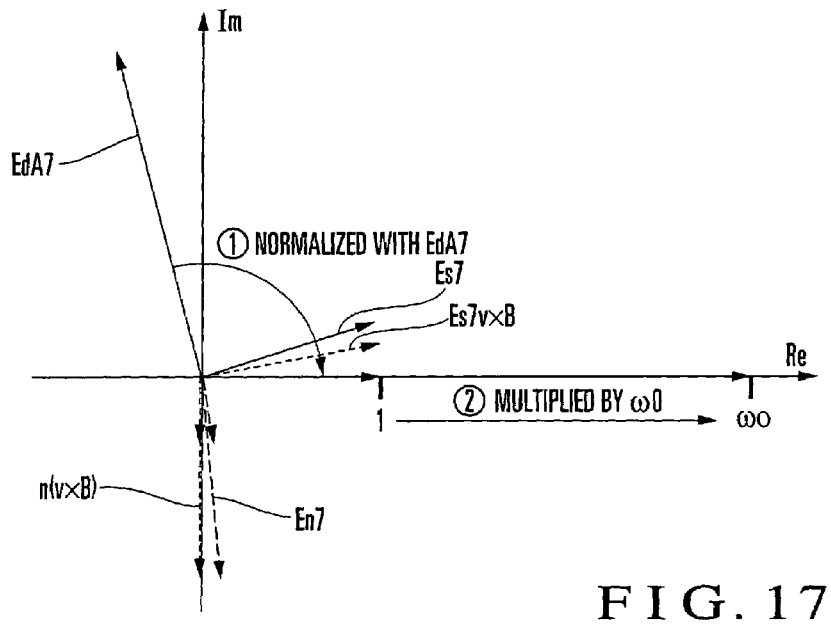
FIG. 17 is a view expressing the manner of normalization processing in the form of complex vectors in the third embodiment of the present invention.

The second term of the right side of equation (85) is the term obtained by normalizing the component generated by v×B with the component generated by $\partial A/\partial t$. FIG. 17 is a view expressing the manner of the above normalization processing in the form of complex vectors. Referring to FIG. 17, reference symbol Es7v×B denotes a v×B component of the electromotive force sum Es7; and n(v×B), a normalized v×B component $[\gamma\cdot\exp\{j\cdot(-p/2+\Delta\theta 01)\}]\cdot V$. The reason why the result obtained by normalizing the electromotive force sum Es7 with the inter-electrode electromotive force EdA7 is multiplied by $\omega 0$ is to erase the exciting angular frequency $\omega 0$ from the second term of the right side associated with the magnitude V of the flow velocity. According to equation (85), the complex coefficient by which the magnitude V of the flow velocity is multiplied has the magnitude of $\gamma$ and the angle of $-p/2+\Delta\theta 01$ with respect to the real axis. The coefficient $\gamma$ and the angle $\Delta\theta 01$ are constants which can be obtained in advance by calibration and the like, and the second term of the right side of equation (85) remains constant unless the flow velocity of the fluid to be measured changes.

Normalizing the v×B component by using the $\partial A/\partial t$ component, therefore, makes it possible to implement span correction of automatically correcting an error due to a magnetic field shift or phase change. Assume that the distance d3 from the plane PLN3 including the axis of the exciting coil 3 to the electrode axis EAX1 connecting the electrodes 2a and 2b is almost equal to the distance d4 from the plane PLN3 to the electrode axis EAX2 connecting the electrodes 2c and 2d. In this case, if $b9 \approx b10$ and $\Delta\theta 10 \approx 0$, the magnitude V of the flow velocity is expressed as follows according to equation (85):

$$V = |En7/[\gamma\cdot\exp\{j\cdot(-\pi/2+\Delta\theta 01)\}]| \quad (86)$$

$$= |En7|/\gamma$$

Table 3 shows the correspondence relationship between the constants and variables used in the basic principle described above and the constants and variables in this embodiment. As is obvious from Table 3, this embodiment is an example of specifically implementing the basic principle described above.

TABLE 3

Correspondence Relationship between Basic Principle and Third Embodiment

| Constants and Variables in Basic Principle | Constants and Variables in Third Embodiment |
|---|---|
| r$\omega$ | 1 |
| rv | $\gamma$ |
| $\theta\omega$ | $\pi/2$ |
| $\theta$v | $\Delta\theta 01$ |
| C | $rk\cdot\exp\{j(\theta 9+\theta 00)\}\cdot\{b9+b10\cdot\exp(j\cdot\Delta\theta 10)\}$ |

Figure 18:
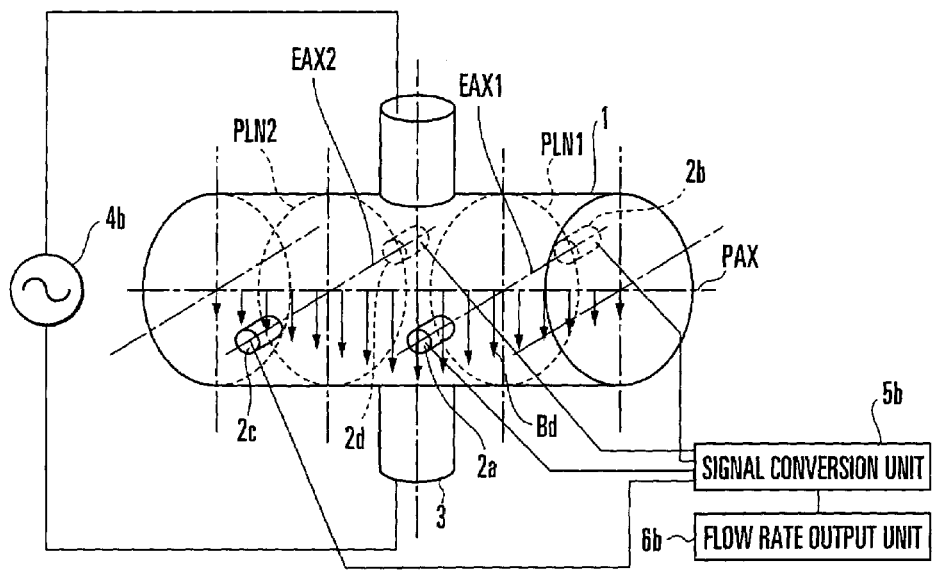
FIG. 18 is a block diagram showing the arrangement of an electromagnetic flowmeter according to the third embodiment of the present invention.

A specific arrangement of the electromagnetic flowmeter of this embodiment and its operation will be described next. FIG. 18 is a block diagram showing the arrangement of the electromagnetic flowmeter according to this embodiment. The same reference numerals as in FIG. 13 denote the same components in FIG. 18. The electromagnetic flowmeter according to this embodiment includes the measuring tube 1, the first electrodes 2a and 2b, the second electrodes 2c and 2d, the exciting coil 3, a power supply unit 4b which supplies exciting currents to the exciting coil 3, a signal conversion unit 5b which obtains the amplitudes and phases of the first resultant electromotive forces detected by the first electrodes 2a and 2b and the second resultant electromotive forces detected by the second electrodes 2c and 2d, respectively, and extracts the electromotive force difference between the first and second resultant electromotive forces as a ∂A/∂t component on the basis of the amplitudes and phases, and a flow rate output unit 6b which removes a variation factor for a span contained in the v×B component in the electromotive force sum of the first resultant electromotive force and second resultant electromotive force on the basis of the extracted ∂A/∂t component, and calculates the flow rate of the fluid to be measured from the result obtained by removing the variation factor.

In this embodiment, as described above, the distance d3 from the plane PLN3 including the axis of the exciting coil 3 to the electrode axis EAX1 connecting the electrodes 2a and 2b is almost equal to the distance d4 from the plane PLN3 to the electrode axis EAX2 connecting the electrodes 2c and 2d.

The power supply unit 4b supplies a sine wave exciting current with an angular frequency ω0 to the exciting coil 3.

The processing of the signal conversion unit 5b and flow rate output unit 6b of this embodiment is the same as that of the second embodiment, and hence the operations of signal conversion unit 5b and flow rate output unit 6b will be described by using the reference numerals in FIG. 12. First of all, the signal conversion unit 5b causes a phase detector (not shown) to obtain an amplitude rs7 of the electromotive force sum Es7 of the first inter-electrode electromotive force E71 and the second inter-electrode electromotive force E72, and obtain a phase difference φs7 between the real axis and the electromotive force sum Es7. Additionally, the signal conversion unit 5b causes a phase detector to obtain an amplitude rd7 of the electromotive force difference Ed7 of the first inter-electrode electromotive force E71 and the second inter-electrode electromotive force E72, and obtain a phase difference φd7 between the real axis and the electromotive force difference Ed7 (step S201 in FIG. 12). The inter-electrode electromotive forces E71 and E72 can separate the frequency by using bandpass filter and comb filter.

The signal conversion unit 5b then calculates a real axis component Es7x and imaginary axis component Es7y of the electromotive force sum Es7, and a real axis component Ed7x and imaginary axis component Ed7y of the electromotive force difference Ed7 according to the following equations (step S202):

$$Es7x = rs7 \cdot \cos(\phi s7) \quad (87)$$

$$Es7y = rs7 \cdot \sin(\phi s7) \quad (88)$$

$$Ed7x = rd7 \cdot \cos(\phi d7) \quad (89)$$

$$Ed7y = rd7 \cdot \sin(\phi d7) \quad (90)$$

After the calculation of equations (87) to (90), the signal conversion unit 5b obtains the magnitude and angle of the electromotive force EdA7 which approximates the electromotive force difference Ed7 (step S203). The processing in step S203 corresponds to the processing of obtaining a ∂A/∂t component and a v×B component, and is equivalent to the calculation of equation (84). The signal conversion unit 5b calculates a magnitude |EdA7| of the electromotive force EdA7 which approximates the electromotive force difference Ed7 according to the following equation:

$$|EdA7| = (Ed7x^2 + Ed7y^2)^{1/2} \quad (91)$$

The signal conversion unit 5b then calculates an angle ∠EdA7 of the difference EdA7 with respect to the real axis according to the following equation:

$$\angle EdA7 = \tan^{-1}(Ed7y/Ed7x) \quad (92)$$

With the above operation, the processing in step S203 is complete.

The flow rate output unit 6b then obtains the magnitude and angle of the normalized electromotive force En7 obtained by normalizing the electromotive force sum Es7 with the inter-electrode electromotive force EdA7 (step S204). The processing in step S204 is equivalent to the calculation of equation (85). The flow rate output unit 6b calculates a magnitude |En7| of the normalized electromotive force En7 according to the following equation:

$$|En7| = (rs7/|EdA7|) \cdot \omega 0 \quad (93)$$

The flow rate output unit 6b also calculates an angle ∠En7 of the normalized electromotive force En7 with respect to the real axis according to the following equation:

$$\angle En7 = \phi s7 - \angle EdA7 \quad (94)$$

With this operation, the processing in step S204 is complete.

The flow rate output unit 6b then calculates the magnitude V of the flow velocity of the fluid to be measured according to equation (86) (step S205). Note that ∠En7 is not directly used in step S205 of obtaining a flow velocity (flow rate). However, this angle is used to perform measurement with higher accuracy by comparing the angle with an angle obtained at the time of calibration and is not directly associated with the essential operation of span correction, and hence a description thereof will be omitted.

The signal conversion unit 5b and the flow rate output unit 6b perform the processing in steps S201 to S205 described above in a cycle until, for example, the end of the measurement is designated by the operator (YES in step S206).

As described above, this embodiment pays attention to the fact that when the first electrodes 2a and 2b are arranged so as to face the second electrodes 2c and 2d through the plane PLN3 including the axis of the exciting coil 3, and the magnitude of the magnetic field B9 on the electrode axis EAX1 connecting the electrodes 2a and 2b is the same as that of the magnetic field B10 on the electrode axis EAX2 connecting the electrodes 2c and 2d. In this case, the electromotive force difference Ed7 between the first and second inter-electrode electromotive forces E71 and E72 can be approximately extracted as the ∂A/∂t component. A span by which the magnitude V of the flow velocity of the v×B component in the electromotive force sum Es7 (resultant vector Va+Vb) is normalized by using this ∂A/∂t component, thereby erasing the span variation element. Therefore, the embodiment can automatically perform accurate span correction and can execute accurate flow rate measurement. In this embodiment, only ω0 may be used as the exciting angular frequency, and there is no need to use two exciting frequencies as in the first to third embodiments.

Note that this embodiment has exemplified the case of extracting the electromotive force difference Ed7 between the first and second inter-electrode electromotive forces E71 and E72 and normalizing the electromotive force sum Es7 by using the electromotive force difference Ed7. However, the present invention is not limited to this. The electromotive force sum Es7 may be approximately extracted as a ∂A/∂t component, and the electromotive force difference Ed7 may be normalized by using this ∂A/∂t component.

In the first to third embodiments, since noise in in-phase components can be removed, there is no need to use the rectangular waveform excitation scheme, and the sine wave excitation scheme using a sine wave for an exciting current can be used. This makes it possible to perform high-frequency excitation. Using high-frequency excitation makes it possible to remove 1/f noise and improve responsiveness with respect to a change in flow rate.

Figure 19:
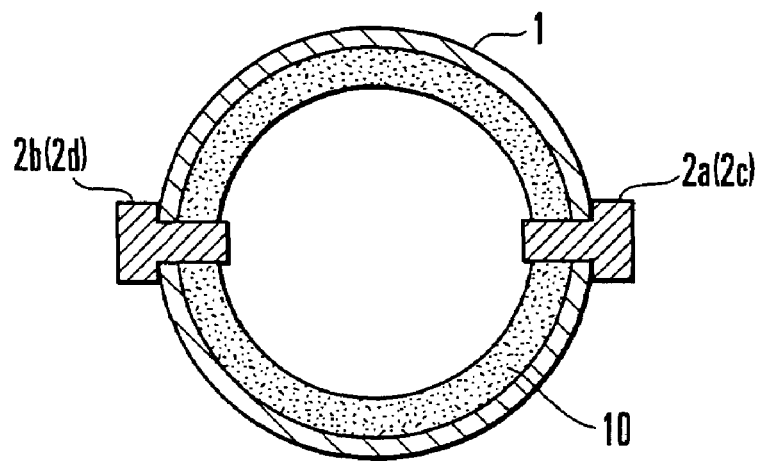
FIG. 19 is a sectional view showing an example of electrodes used in an electromagnetic flowmeter according to the present invention.
Figure 20:
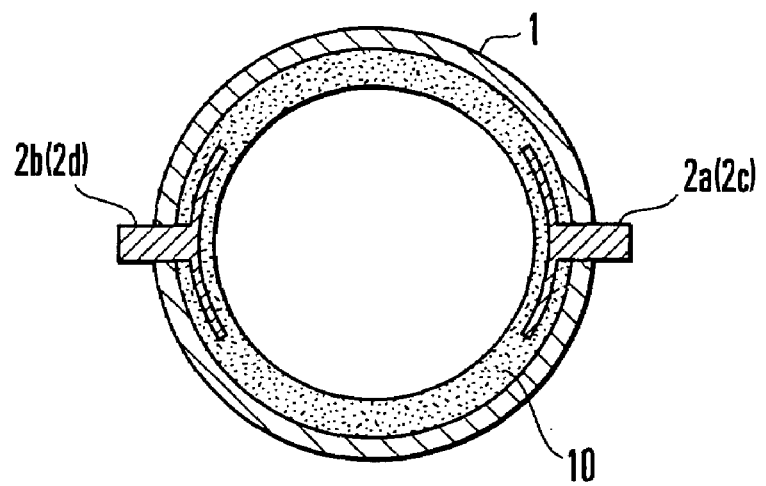
FIG. 20 is a sectional view showing another example of electrodes used in the electromagnetic flowmeter according to the present invention.

As the electrodes 2a, 2b, 2c, and 2d used in the first to third embodiments, electrodes which are shaped to be exposed from the inner wall of the measuring tube 1 and come into contact with a fluid to be measured as shown in FIG. 19, or capacitive coupling type electrodes which do not come into contact with a fluid to be measured as shown in FIG. 20 may be used. When the electrodes 2a, 2b, 2c, and 2d are of a capacitive coupling type, they are coated with a lining 10 made of ceramic, Teflon®, or the like formed on the inner wall of the measuring tube 1.

The first to third embodiments use one pair of electrodes 2a and 2b as the first electrodes, and one pair of electrodes 2c and 2d as the second electrodes. However, the present invention is not limited to this. These embodiments may use one each of the first and second electrodes. If only one electrode is to be used, a ground ring or ground electrode for grounding the potential of a fluid to be measured is provided on the measuring tube 1, and the electromotive force (the potential difference from the ground potential) generated on the one electrode may be detected by the signal conversion units 5, 5a, and 5b. When one pair of electrodes are to be used, an electrode axis is a straight line connecting the pair of electrodes. When only one electrode is to be used, an electrode axis is a straight line connecting the real electrode to a virtual electrode, assuming that the virtual electrode is placed at a position to face the real electrode through the measuring tube axis PAX on the plane PLN including the one real electrode.

Furthermore, in the first to third embodiments, of the signal conversion units 5, 5a, 5b and the flow rate output units 6, 6a, and 6b, components except for those used for the detection of electromotive forces can be implemented by a computer including a CPU, storage device, and interface, and programs which control these hardware resources.

INDUSTRIAL APPLICABILITY

The present invention can be applied to flow rate measurement of a fluid to be measured which flows in a measuring tube.

The invention claimed is:

1. An electromagnetic flowmeter characterized by comprising:
a measuring tube through which a fluid to be measured flows;
an electrode which is placed in said measuring tube and detects an electromotive force generated by a magnetic field applied to the fluid and a flow of the fluid;
an exciting unit which applies, to the fluid, a time-changing magnetic field asymmetrical to a first plane which includes said electrode and is perpendicular to an axial direction of said measuring tube;
a signal conversion unit which extracts a ∂A/∂t component irrelevant to a flow velocity of the fluid from a resultant electromotive force of an electromotive force based on the ∂A/∂t component and an electromotive force based on a v×B component originating from the flow velocity of the fluid; and
a flow rate output unit which removes a variable factor for a span as a coefficient by which a magnitude V of a flow velocity of the v×B component in the resultant electromotive force is multiplied, on the basis of the extracted ∂A/∂t component, and calculates a flow rate of the fluid from a result obtained by removing the variation factor.

2. An electromagnetic flowmeter according to claim 1, characterized in that
said exciting unit applies the magnetic fields to the fluid with a plurality of exciting frequencies, and
said signal conversion unit obtains an amplitude and phase of each of at least two different frequency components of the resultant electromotive force detected by the electrode to extract the ∂A/∂t component.

3. An electromagnetic flowmeter according to claim 2, characterized in that
said exciting unit comprises an exciting coil placed at a position spaced apart by an offset from the first plane which includes said electrode and is perpendicular to the axial direction of said measuring tube, and a power supply unit which supplies, to the exciting coil, an exciting current containing two different frequency components of the first frequency and the second frequency,
said signal conversion unit obtains amplitudes and phases of two frequency components of the first frequency and the second frequency of the resultant electromotive force detected by the electrode, and extracts an electromotive force difference between the two frequency components as the ∂A/∂t component on the basis of the amplitudes and phases, and
said flow rate output unit removes a span variation factor contained in a v×B component in the first frequency component or a v×B component in the second frequency component of the resultant electromotive force detected by the electrode on the basis of the extracted ∂A/∂t component, and calculates a flow rate of the fluid from a result obtained by removing the variation factor.

4. An electromagnetic flowmeter according to claim 1, characterized in that
said exciting unit comprises an exciting coil placed at a position spaced apart by an offset from the first plane which includes said electrode and is perpendicular to the axial direction of said measuring tube, and a power supply unit which supplies, to the exciting coil, an exciting current containing two different frequency components of the first frequency and the second frequency,
said signal conversion unit obtains amplitudes and phases of two frequency components of the first frequency and the second frequency of the resultant electromotive force detected by the electrode, and extracts an electromotive force difference between the two frequency components as the ∂A/∂t component on the basis of the amplitudes and phases, and
said flow rate output unit removes a span variation factor contained in a v×B component in the first frequency component or a v×B component in the second frequency component of the resultant electromotive force detected by the electrode on the basis of the extracted ∂A/∂t component, and calculates a flow rate of the fluid from a result obtained by removing the variation factor.

5. An electromagnetic flowmeter according to claim 1, characterized in that
said exciting unit applies the magnetic fields having different exciting frequencies from a plurality of exciting coils to the fluid with a plurality of exciting frequencies, and
said signal conversion unit obtains an amplitude and phase of each of at least two different frequency components of the resultant electromotive force detected by the electrode to extract the $\partial A/\partial t$ component.

6. An electromagnetic flowmeter according to claim 5, characterized in that said exciting unit comprises a first exciting coil placed at a position spaced apart by a first offset from the first plane which includes said electrode and is perpendicular to the axial direction of said measuring tube, a second exciting coil which is placed at a position spaced apart by a second offset from the first plane so as to face the first exciting coil through the first plane, and a power supply unit which supplies exciting currents with the second frequency different from the first frequency to the second exciting coil while supplying the exciting current with the first frequency to the first exciting coil, said signal conversion unit obtains amplitudes and phases of two frequency components of the first frequency and the second frequency of the resultant electromotive force detected by the electrode, and extracts an electromotive force difference between the two frequency components as the $\partial A/\partial t$ component on the basis of the amplitudes and the phases, and said flow rate output unit removes a variation factor for a span contained in a v×B component in a electromotive sum of the two frequency components of the resultant electromotive force detected by the electrode on the basis of the extracted $\partial A/\partial t$ component, and calculates a flow rate of the fluid from a result obtained by removing the variation factor.

7. An electromagnetic flowmeter according to claim 5, characterized in that said exciting unit comprises a first exciting coil placed at a position spaced apart by a first offset from the first plane which includes said electrode and is perpendicular to the axial direction of said measuring tube, a second exciting coil which is placed at a position spaced apart by a second offset from the first plane so as to face the first exciting coil through the first plane, and a power supply unit which supplies exciting currents with the second frequency different from the first frequency to the second exciting coil while supplying the exciting current with the first frequency to the first exciting coil, said signal conversion unit obtains amplitudes and phases of two frequency components of the first frequency and the second frequency of the resultant electromotive force detected by the electrode, and extracts an electromotive force sum of the two frequency components as the $\partial A/\partial t$ component on the basis of the amplitudes and the phases, and said flow rate output unit removes a variation factor for a span contained in a v×B component in a electromotive difference between the two frequency components of the resultant electromotive force detected by the electrode on the basis of the extracted $\partial A/\partial t$ component, and calculates a flow rate of the fluid from a result obtained by removing the variation factor.

8. An electromagnetic flowmeter according to claim 1, characterized in that said exciting unit comprises a first exciting coil placed at a position spaced apart by a first offset from the first plane which includes said electrode and is perpendicular to the axial direction of said measuring tube, a second exciting coil which is placed at a position spaced apart by a second offset from the first plane so as to face the first exciting coil through the first plane, and a power supply unit which supplies exciting currents with the second frequency different from the first frequency to the second exciting coil while supplying the exciting current with the first frequency to the first exciting coil, said signal conversion unit obtains amplitudes and phases of two frequency components of the first frequency and the second frequency of the resultant electromotive force detected by the electrode, and extracts an electromotive force difference between the two frequency components as the $\partial A/\partial t$ component on the basis of the amplitudes and the phases, and said flow rate output unit removes a variation factor for a span contained in a v×B component in a electromotive sum of the two frequency components of the resultant electromotive force detected by the electrode on the basis of the extracted $\partial A/\partial t$ component, and calculates a flow rate of the fluid from a result obtained by removing the variation factor.

9. An electromagnetic flowmeter according to claim 1, characterized in that said exciting unit comprises a first exciting coil placed at a position spaced apart by a first offset from the first plane which includes said electrode and is perpendicular to the axial direction of said measuring tube, a second exciting coil which is placed at a position spaced apart by a second offset from the first plane so as to face the first exciting coil through the first plane, and a power supply unit which supplies exciting currents with the second frequency different from the first frequency to the second exciting coil while supplying the exciting current with the first frequency to the first exciting coil, said signal conversion unit obtains amplitudes and phases of two frequency components of the first frequency and the second frequency of the resultant electromotive force detected by the electrode, and extracts an electromotive force sum of the two frequency components as the $\partial A/\partial t$ component on the basis of the amplitudes and the phases, and said flow rate output unit removes a variation factor for a span contained in a v×B component in a electromotive difference between the two frequency components of the resultant electromotive force detected by the electrode on the basis of the extracted $\partial A/\partial t$ component, and calculates a flow rate of the fluid from a result obtained by removing the variation factor.

10. An electromagnetic flowmeter according to claim 1, characterized in that the electrode comprises a plurality of electrodes placed at different places along an axis direction of the measuring tube, and said signal conversion unit obtains an amplitude and phase of the resultant electromotive force detected by at least two electrodes of the resultant electromotive force detected by the plurality of electrodes to extract the $\partial A/\partial t$ component.

11. An electromagnetic flowmeter according to claim 10, characterized in that said exciting unit comprises an exciting coil which applies a magnetic field to the fluid and a power supply unit which supplies an exciting current to the exciting coil, said electrode comprises a first electrode placed at a position spaced apart by a first offset from a second plane which include an axis of the exciting coil and is perpendicular to an axial direction of said measuring tube, and a second electrode which is placed at a position spaced apart by a second offset from the second plane so as to face the first electrode through the second plane, said signal conversion unit obtains amplitudes and phases of the first resultant electromotive force detected by the first electrode and the second resultant electromotive force detected by the second electrode, and extracts an electromotive force difference between the first resultant electromotive force and the second resultant electromotive force as the $\partial A/\partial t$ component on the basis of the amplitudes and phases, and said flow rate output unit removes a variation factor for a span contained in a v×B component in an electromotive force sum of the first resultant electromotive force and the second resultant electromotive force on the basis the extracted $\partial A/\partial t$ component, and calculates a flow rate of the fluid from a result obtained by removing the variation factor.

12. An electromagnetic flowmeter according to claim 10, characterized in that said exciting unit comprises an exciting coil which applies a magnetic field to the fluid and a power supply unit which supplies an exciting current to the exciting coil, said electrode comprises a first electrode placed at a position spaced apart by a first offset from a second plane which include an axis of the exciting coil and is perpendicular to an axial direction of said measuring tube, and a second electrode which is placed at a position spaced apart by a second offset from the second plane so as to face the first electrode through the second plane, said signal conversion unit obtains amplitudes and phases of the first resultant electromotive force detected by the first electrode and the second resultant electromotive force detected by the second electrode, and extracts an electromotive force sum of the first resultant electromotive force and the second resultant electromotive force as the $\partial A/\partial t$ component on the basis of the amplitudes and phases, and said flow rate output unit removes a variation factor for a span contained in a v×B component in an electromotive force difference between the first resultant electromotive force and the second resultant electromotive force on the basis the extracted $\partial A/\partial t$ component, and calculates a flow rate of the fluid from a result obtained by removing the variation factor.

13. An electromagnetic flowmeter according to claim 1, characterized in that said exciting unit comprises an exciting coil which applies a magnetic field to the fluid and a power supply unit which supplies an exciting current to the exciting coil, said electrode comprises a first electrode placed at a position spaced apart by a first offset from a second plane which include an axis of the exciting coil and is perpendicular to an axial direction of said measuring tube, and a second electrode which is placed at a position spaced apart by a second offset from the second plane so as to face the first electrode through the second plane, said signal conversion unit obtains amplitudes and phases of the first resultant electromotive force detected by the first electrode and the second resultant electromotive force detected by the second electrode, and extracts an electromotive force difference between the first resultant electromotive force and the second resultant electromotive force as the $\partial A/\partial t$ component on the basis of the amplitudes and phases, and said flow rate output unit removes a variation factor for a span contained in a v×B component in an electromotive force sum of the first resultant electromotive force and the second resultant electromotive force on the basis the extracted $\partial A/\partial t$ component, and calculates a flow rate of the fluid from a result obtained by removing the variation factor.

14. An electromagnetic flowmeter according to claim 1, characterized in that said exciting unit comprises an exciting coil which applies a magnetic field to the fluid and a power supply unit which supplies an exciting current to the exciting coil, said electrode comprises a first electrode placed at a position spaced apart by a first offset from a second plane which include an axis of the exciting coil and is perpendicular to an axial direction of said measuring tube, and a second electrode which is placed at a position spaced apart by a second offset from the second plane so as to face the first electrode through the second plane, said signal conversion unit obtains amplitudes and phases of the first resultant electromotive force detected by the first electrode and the second resultant electromotive force detected by the second electrode, and extracts an electromotive force sum of the first resultant electromotive force and the second resultant electromotive force as the $\partial A/\partial t$ component on the basis of the amplitudes and phases, and said flow rate output unit removes a variation factor for a span contained in a v×B component in an electromotive force difference between the first resultant electromotive force and the second resultant electromotive force on the basis the extracted $\partial A/\partial t$ component, and calculates a flow rate of the fluid from a result obtained by removing the variation factor.

* * * * *